(12) United States Patent
Hejl et al.

(10) Patent No.: US 11,736,811 B2
(45) Date of Patent: *Aug. 22, 2023

(54) APPARATUSES, METHODS, AND COMPUTER PROGRAM PRODUCTS FOR FLICKER REDUCTION IN A MULTI-SENSOR ENVIRONMENT

(71) Applicant: Hand Held Products, Inc., Charlotte, NC (US)

(72) Inventors: Benjamin Hejl, Cherry Hill, NJ (US); Ka Man Au, Philadelphia, PA (US); Erik Van Horn, Seaville, NJ (US); David M. Wilz, Sewell, NJ (US); Michael V. Miraglia, Hamilton, NJ (US); Patrick Giordano, Glassboro, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,794

(22) Filed: Sep. 23, 2022

(65) Prior Publication Data

US 2023/0018060 A1    Jan. 19, 2023

Related U.S. Application Data

(63) Continuation of application No. 17/446,773, filed on Sep. 2, 2021, now Pat. No. 11,490,030, which is a
(Continued)

(51) Int. Cl.
*G06K 7/10* (2006.01)
*H04N 23/745* (2023.01)

(52) U.S. Cl.
CPC ......... *H04N 23/745* (2023.01); *G06K 7/1095* (2013.01); *G06K 7/10881* (2013.01)

(58) Field of Classification Search
CPC ............. H04N 5/2357; G06K 7/10881; G06K 7/10693; G06K 7/10722; G06K 7/10861; G06K 7/1095; G06K 7/14; G06K 7/1413
(Continued)

(56) References Cited

U.S. PATENT DOCUMENTS 8,780,232 B2    7/2014  Craig et al.
8,794,526 B2    8/2014  Wang et al.
(Continued)

FOREIGN PATENT DOCUMENTS

CN    205176875 U    4/2016
CN    106339648 A    1/2017
(Continued)

OTHER PUBLICATIONS

CN Office Action dated Aug. 26, 2022 for CN Application No. 202110223722.
(Continued)

*Primary Examiner* — Edwyn Labaze
(74) *Attorney, Agent, or Firm* — Alston & Bird LLP

(57) ABSTRACT

Embodiments of the disclosure relate generally to flicker reduction in a multi-imager environment. Embodiments include methods, computer program products, and apparatuses configured for producing a near-field illumination using a near-field illuminator, the near-field illumination produced at a defined pulse train. A near-field image sensor may be exposed near the start of a near-field illumination pulse, and a far-field image sensor may be exposed between pulses of the near-field illumination. Some embodiments, additionally or alternatively, are configured for detecting an illuminator switch event, deactivating the near-field illuminator source, and producing, using a far-field illuminator source, a far-field illumination. Upon switching the illuminator source, some such embodiments are configured for
(Continued)

exposing a far-field illuminator near the start of the far-field illumination pulse, and exposing a near-field image sensor near the start of the next available far-field illumination pulse. Such image capture may repeat until an image processing task such as barcode reading is successful.

20 Claims, 15 Drawing Sheets

Related U.S. Application Data continuation of application No. 16/805,497, filed on Feb. 28, 2020, now Pat. No. 11,212,460.

(58) Field of Classification Search
USPC .................................. 235/462.01, 454, 375
See application file for complete search history.

(56) References Cited

U.S. PATENT DOCUMENTS

| | | | |
|---|---|---|---|
| 9,418,270 | B2 | 8/2016 | Volkinburg et al. |
| 9,743,010 | B1 | 8/2017 | Edwards |
| 2002/0176605 | A1 | 11/2002 | Stafsudd et al. |
| 2006/0180670 | A1 | 8/2006 | Acosta et al. |
| 2008/0277473 | A1 | 11/2008 | Kotlarsky et al. |
| 2012/0138684 | A1 | 6/2012 | Van Volkinburg et al. |
| 2012/0228382 | A1 | 9/2012 | Havens et al. |
| 2016/0188933 | A1 | 6/2016 | Powell et al. |
| 2017/0011243 | A1 | 1/2017 | Hammer |
| 2019/0174042 | A1 | 6/2019 | Johannessen et al. |
| 2019/0205583 | A1 | 7/2019 | Bruni et al. |
| 2021/0216950 | A1 | 7/2021 | Bizoara et al. |
| 2021/0264124 | A1 | 8/2021 | Feng et al. |
| 2021/0279436 | A1* | 9/2021 | Barkan ................ G06K 7/1465 |

FOREIGN PATENT DOCUMENTS

| | | |
|---|---|---|
| CN | 107111737 A | 8/2017 |
| CN | 110070684 A | 7/2019 |
| EP | 2498203 A2 | 9/2012 |
| EP | 3343896 A1 | 7/2018 |
| WO | 2018/165945 A1 | 9/2018 |
| WO | 2019/064075 A2 | 4/2019 |

OTHER PUBLICATIONS

European Search Report and Search Opinion received for EP Application No. 21158835.5, dated Jun. 15, 2021, 5 pages.
Extended European Search Report issued in European Application No. 21158835.5 dated Jun. 15, 2021, 5 pages.
Intention to grant dated Jul. 7, 2022 for EP Application No. 21158835.
List of references Mailed on Feb. 16, 2021 for U.S. Appl. No. 16/805,497.
List of references Mailed on Jun. 23, 2022 for U.S. Appl. No. 17/446,773.
Non-Final Rejection dated Feb. 16, 2021 for U.S. Appl. No. 16/805,497.
Notice of Allowance and Fees Due (PTOL-85) dated May 12, 2021 for U.S. Appl. No. 16/805,497.
Notice of Allowance received for U.S. Appl. No. 16/805,497, dated Aug. 20, 2021, 9 pages.
Notice of Allowance received for U.S. Appl. No. 17/446,773, dated Jun. 23, 2022, 9 pages.
Decision to grant a European patent received for European Application No. 21158835.5, dated Nov. 17, 2022, 2 pages.
Extended European Search Report for EP No. 22211856.4 dated Feb. 22, 2023 (9 pages).
CN Notice of Allowance dated Mar. 31, 2023 for CN Application No. 202110223722, 2 page(s).
English translation of CN Notice of Allowance dated May 31, 2023 for CN Application No. 202110223722, 3 page(s).

* cited by examiner

APPARATUSES, METHODS, AND COMPUTER PROGRAM PRODUCTS FOR FLICKER REDUCTION IN A MULTI-SENSOR ENVIRONMENT

CROSS-REFERENCE TO RELATED APPLICATIONS

This application is a continuation of U.S. patent application Ser. No. 17/446,773, filed Sep. 2, 2021, titled "Apparatuses, Methods, And Computer Program Products For Flicker Reduction In A Multi-Sensor Environment," which is a continuation of U.S. patent application Ser. No. 16/805,497, filed Feb. 28, 2020, titled "Apparatuses, Methods, And Computer Program Products For Flicker Reduction In A Multi-Sensor Environment," the contents of each of which are incorporated by reference herein in their entirety.

TECHNOLOGICAL FIELD

Embodiments of the present disclosure generally relate to reducing flicker caused by a plurality of light sources, and specifically to flicker reduction in a multi-sensor environment including a plurality of image sensors and/or illuminator sources while enabling effective successful completion of an image processing task, such as barcode scanning and/or other visual indicia reading.

BACKGROUND

Imaging engines, for example used for barcode reading, include one or more light sources that produce light to illuminate a particular field of view. The light may illuminate a field of view to be captured by the engine, and/or one or more associated components, to produce one or more images for processing. For example, the imaging engine may capture one or more images for performing a particular image processing task. In one example context, the imaging engine defines an image processing apparatus utilized for barcode reading. However, in some conventional implementations, light flicker from one or more light sources can cause visually unappealing implementations, or in some circumstances physically harmful implementation (for example, due to negatively affecting the eyes of an observer and/or triggering conditions such as epilepsy). Specifically in the context of multi-imager environments (e.g., including a plurality of imagers and/or a plurality of light sources), naïve implementations for capturing images, such as by alternating between imagers and/or light sources, exacerbate such flickering effects, and therefore exacerbate the negative effects associated therewith. Applicant has discovered problems with current implementations of reducing flicker in a multi-imager environment. Through applied effort, ingenuity, and innovation, Applicant has solved many of these identified problems by developing embodied in the present disclosure, which are described in detail below.

BRIEF SUMMARY

In general, embodiments of the present disclosure provided herein are configured for flicker reduction in a multi-imager environment. Other implementations for flicker reduction will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for flicker reduction in a multi-imager environment is provided. The computer-implemented method is executable by any of the computing device(s) embodied in hardware, software, firmware, and/or the like, as described herein. In one example embodiment the computer-implemented method includes producing, using a first illuminator source of a plurality of illuminator sources, a first illumination, where the plurality of illuminator sources comprises more than two illuminator sources. The example computer-implemented method further includes exposing a near-field image sensor during the first illumination. The example computer-implemented method further includes generating a first near-field image based on the exposure of the near-field image sensor. The example computer-implemented method further includes exposing a far-field image sensor such that the exposure of the far-field image sensor is not during any pulse associated with the first illumination. The example computer-implemented method further includes generating a first far-field image based on the exposure of the far-field image sensor. The example computer-implemented method further includes repeating steps (b)-(e) until a first illumination switch event is detected. The example computer-implemented method further includes detecting a first illuminator switch event. The example computer-implemented method further includes, in response to the detection of the first illuminator switch event deactivating the first illuminator source; producing, using a second illuminator source of the plurality of illuminator sources, a second illumination associated with at least one second illumination pulse, wherein a second field of view illuminated by the second illuminator source is different than a first field of view illuminated by the first illuminator source; exposing the near-field image sensor during the second illumination; generating a second near-field image based on the exposure of the near-field image sensor during the second illumination; exposing the far-field image sensor such that the exposure of the far-field image sensor is not during any pulse associated with the second illumination; generating the far-field image based on the exposure of the far-field image sensor during the second illumination; and repeating steps (j)-(m) for the second illuminator source until a second illuminator switch event is detected.

Additionally or alternatively, in some embodiments of the example computer-implemented method, the field of view illuminated by the second illuminator source is narrower than the field of view illuminated by the first illuminator source.

Additionally or alternatively, in some embodiments of the example computer-implemented method, the example computer-implemented method further includes detecting the second illuminator switch event, and in response to the detection of the second illuminator switch event: deactivating the second illuminator source; producing, using a third illuminator source of the plurality of illuminator sources, a third illumination associated with at least one third illumination pulse, wherein a field of view illuminated by the third illuminator source is narrower than the field of view illuminated by the first illuminator source; exposing the near-field image sensor during the third illumination; generating a third near-field image based on the exposure of the near-field image sensor during the third illumination; exposing the far-field image sensor such that the exposure of the far-field image sensor is not during any pulse associated with the third illumination; generating the far-field image based on the exposure of the far-field image sensor during the third illumination; and repeating steps (r)-(u) for the third illuminator source till a third illuminator switch event is detected.

Additionally or alternatively, in some embodiments of the example computer-implemented method, whenever a subsequent illuminator switch event is detected, steps (h)-(n) are repeated corresponding to a subsequent illumination associated with a subsequent illuminator source of the plurality of illuminator sources, the subsequent illumination illuminating a subsequent field of view wherein the subsequent field of view illuminated by the subsequent illuminator source is narrower than the field of view illuminated by a previous illuminator source, and wherein a first effective range provided by the subsequent illuminator is greater than a second effective range provided by the previous illuminator source.

Additionally or alternatively, in some embodiments of the example computer-implemented method, the example computer-implemented method further include, prior to exposing the near-field image sensor during the first illumination, determining that the near-field image sensor was last utilized for capturing an image that was successfully processed.

Additionally or alternatively, in some embodiments of the example computer-implemented method, a first pulse associated with the first illumination is produced at a same rate and for a same length as a second pulse associated with the second illumination.

Additionally or alternatively, in some embodiments of the example computer-implemented method, each illuminator source of the plurality of illuminator sources is configured to produce illumination pulses based on a respective defined pulse frequency and a respective defined pulse phase.

Additionally or alternatively, in some embodiments of the example computer-implemented method, detecting the first illuminator switch event includes determining each captured image of a captured image set is associated with an image property that does not satisfy an image property threshold, where the captured image set comprises at least the near-field image and the far-field image, where the captured image set comprises a number of captured images, where the number of captured images satisfies a near-illuminator capture threshold, and wherein the image property comprises an image white level value, and wherein the image property threshold comprises a minimum white level threshold.

Additionally or alternatively, in some embodiments of the example computer-implemented method, the near-field imaging sensor is utilized to capture a plurality of near-field images prior to exposing the far-field image sensor.

Additionally or alternatively, in some embodiments of the example computer-implemented method, a beginning of the exposure of the far-field image sensor is near-aligned with a first pulse end time of a first pulse associated with the first illumination.

Additionally or alternatively, in some embodiments of the example computer-implemented method, the example computer-implemented method further includes processing the first far-field image to determine an image property associated with the far-field image does not satisfy an image property threshold associated with the image property; and altering at least one of an exposure time value for the far-field image sensor or a gain value for the far-field image sensor.

In accordance with a second aspect of the disclosure, an apparatus for flicker reduction in a multi-imager environment is provided. In one example embodiment of the apparatus, the apparatus includes at least one processor and at least one memory having computer coded instructions stored thereon that, in execution with the at least one processor, cause the apparatus to perform any one of the computer-implemented methods described herein. In another example embodiment of the apparatus, the apparatus includes a multi-sensor imaging engine comprising a plurality of illuminator sources, a near-field image sensor, and a far-field image sensor; and a processor that configures the apparatus to perform any one of the computer-implemented methods described herein. In yet another example embodiment of the apparatus, the apparatus includes means for performing each step of any one of the computer-implemented methods described herein.

In accordance with a third aspect of the present disclosure, a computer program product for flicker reduction in a multi-imager environment is provided. In one example embodiment of the computer program product, the computer program product includes at least one non-transitory computer-readable storage medium having computer program code stored thereon. The computer program code in execution with at least one processor configures the computer program product for performing any one of the example computer-implemented methods described herein.

BRIEF DESCRIPTION OF THE DRAWINGS

Figure 1:
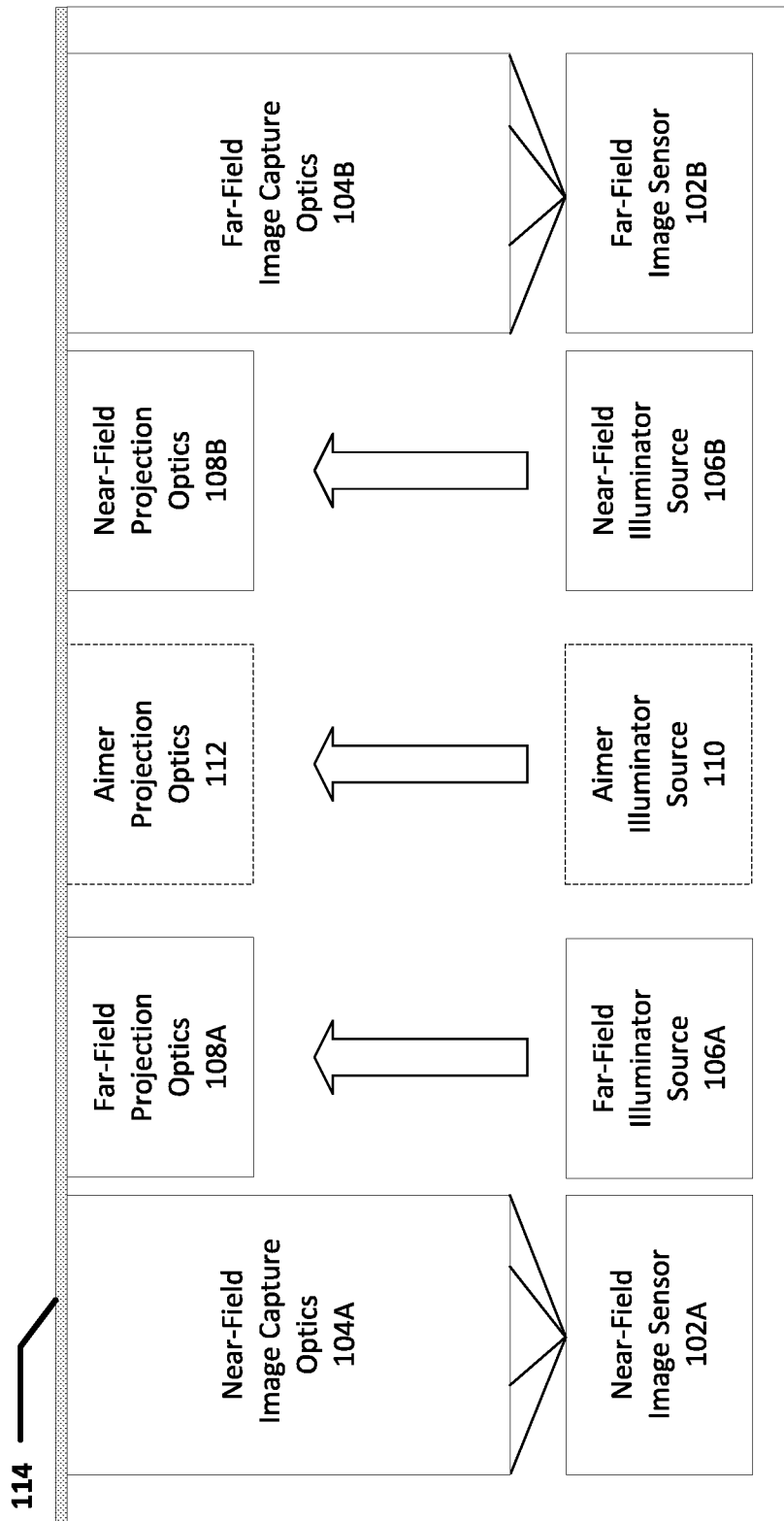
Figure 2:
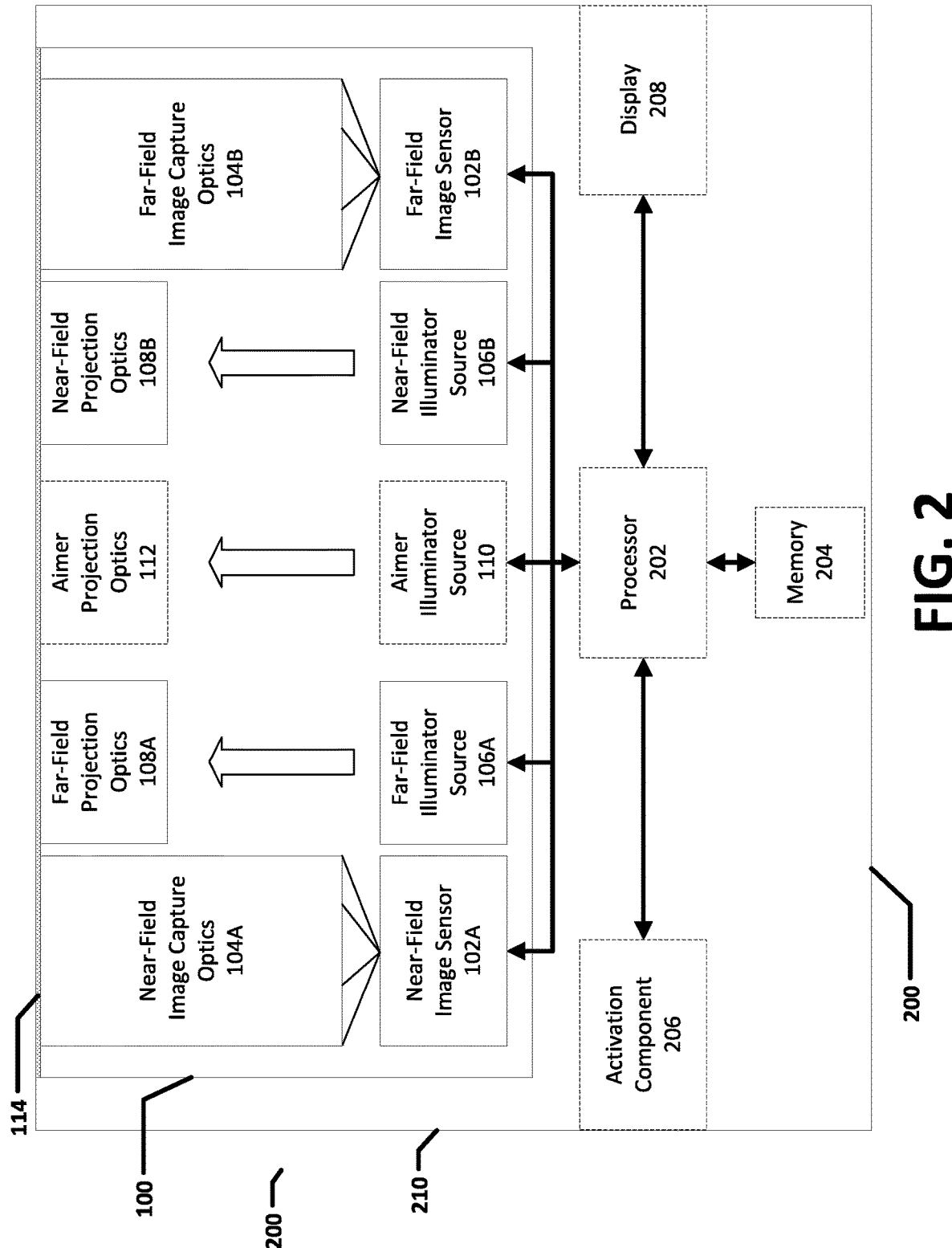
Figure 3:
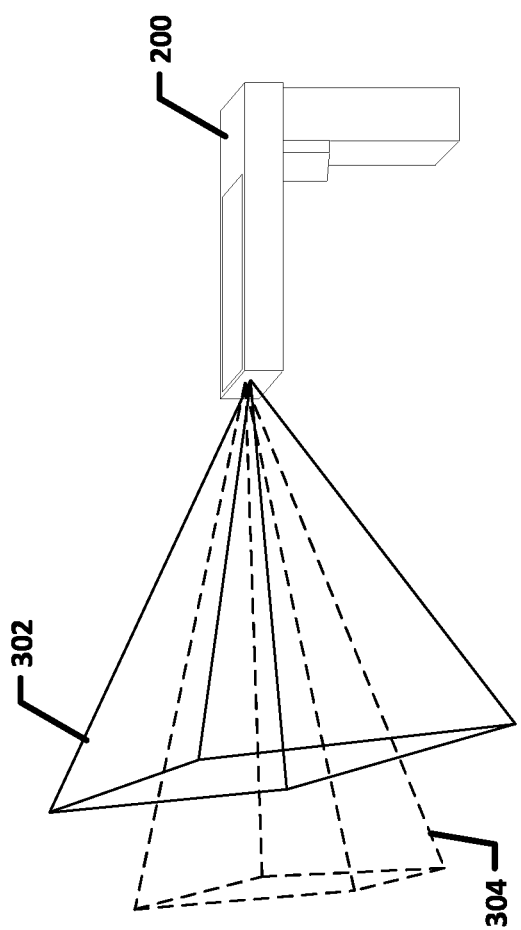
Figure 4:
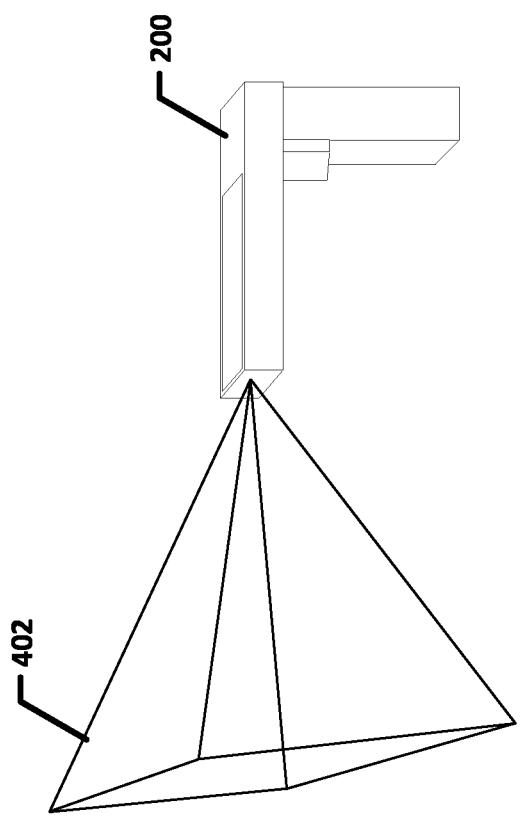
Figure 5:
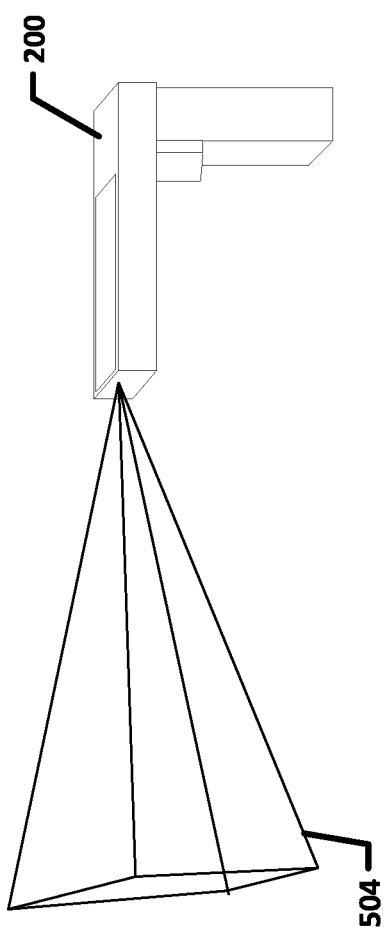
Figure 6:
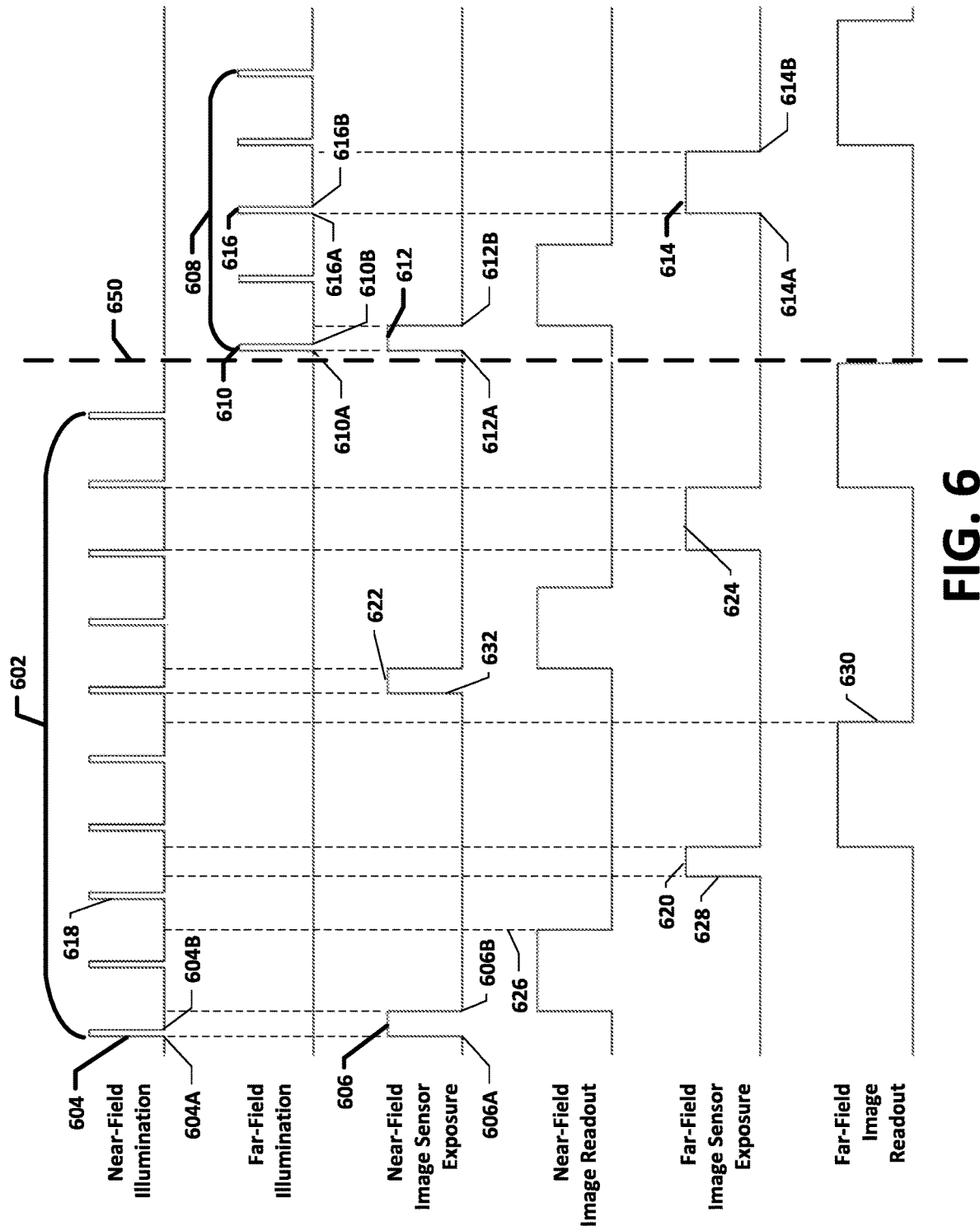
Figure 7:
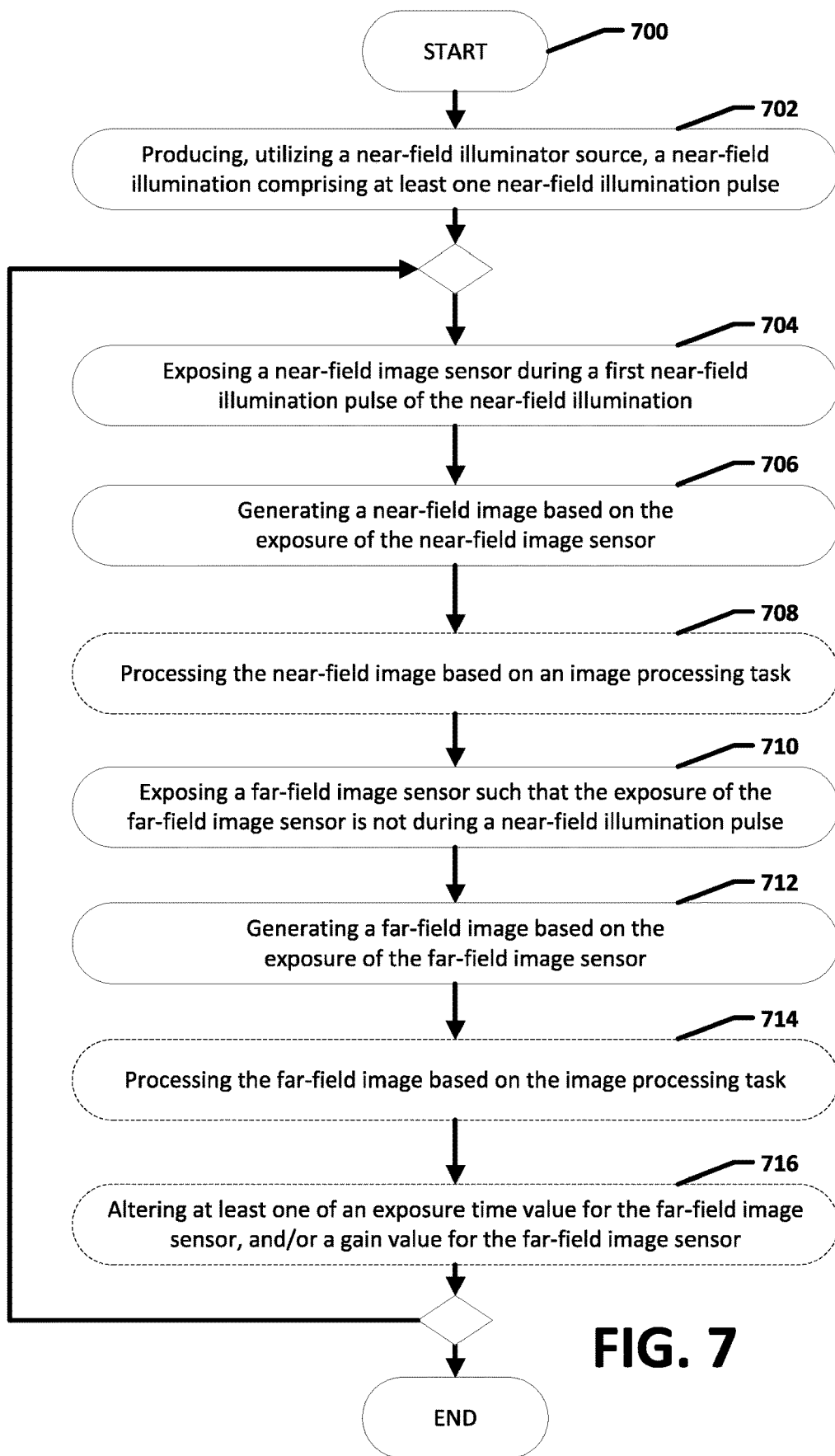
Figure 8:
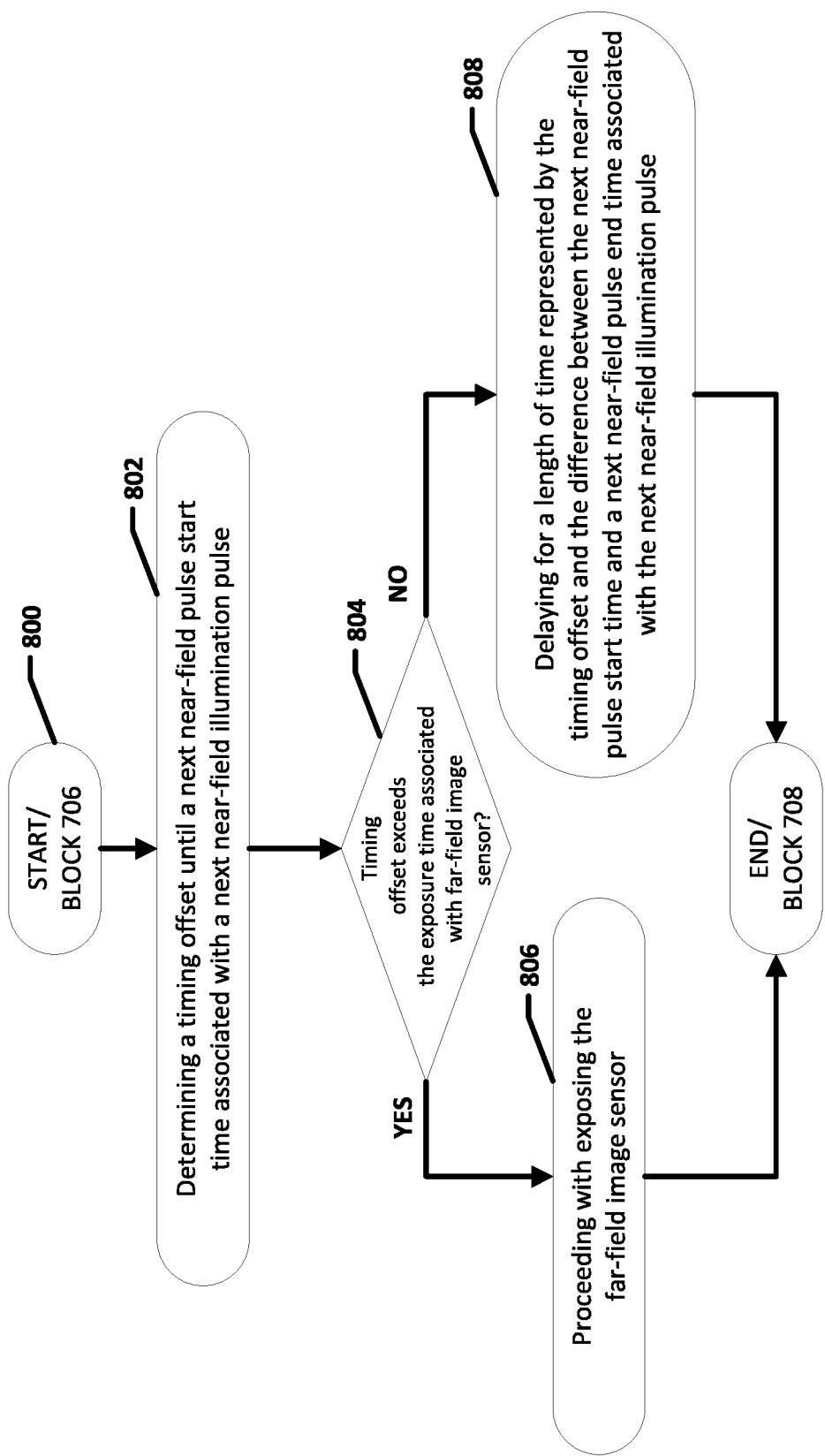
Figure 9:
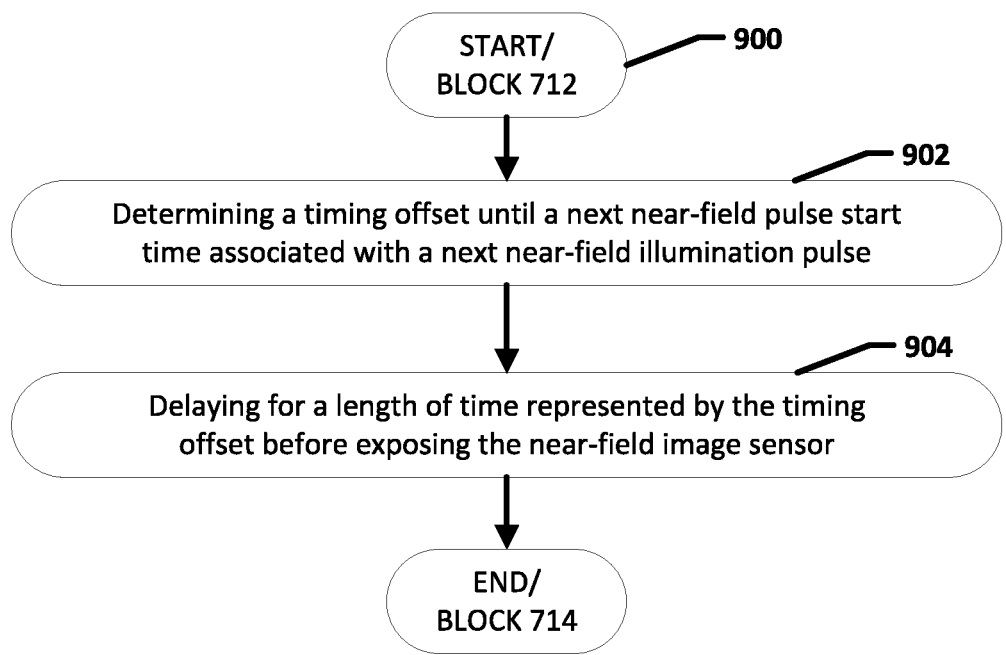
Figure 10:
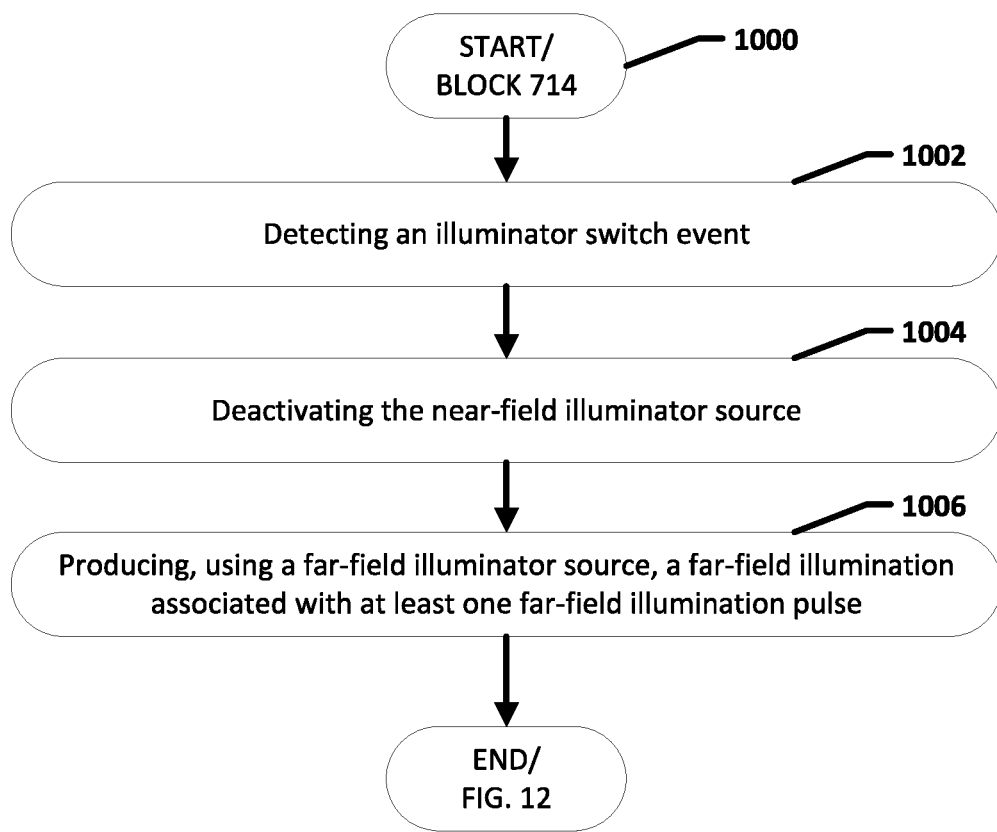
Figure 11:
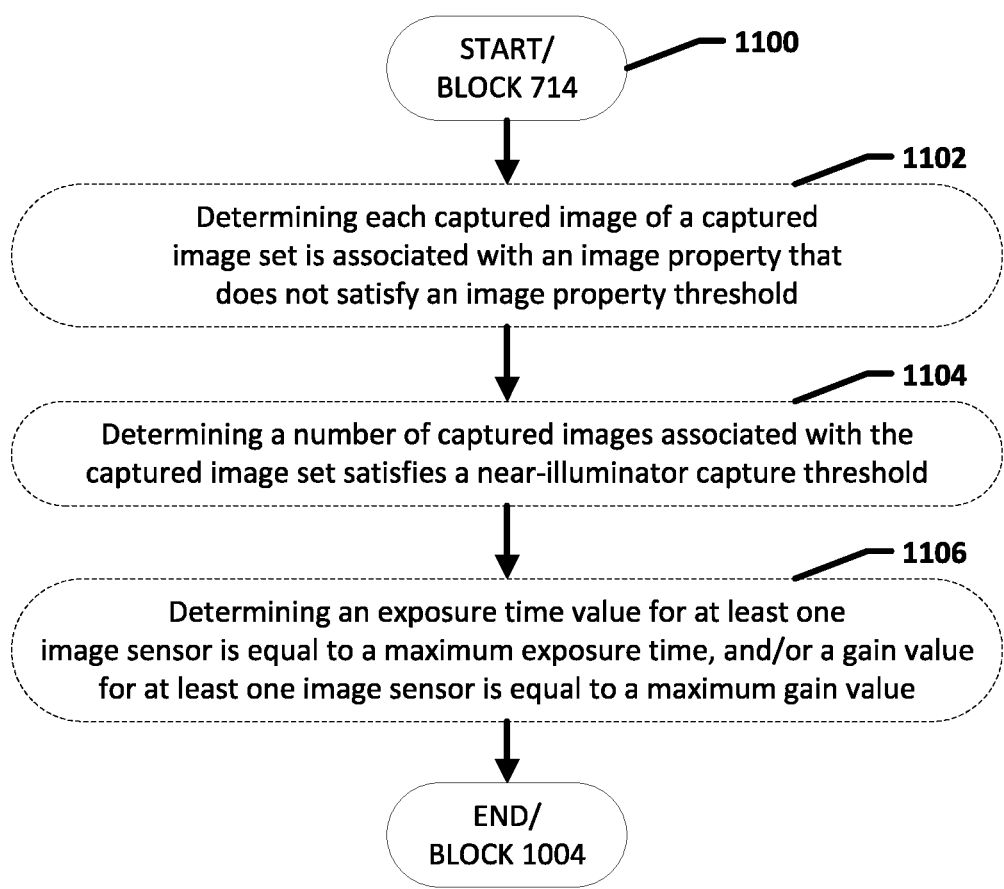
Figure 12:
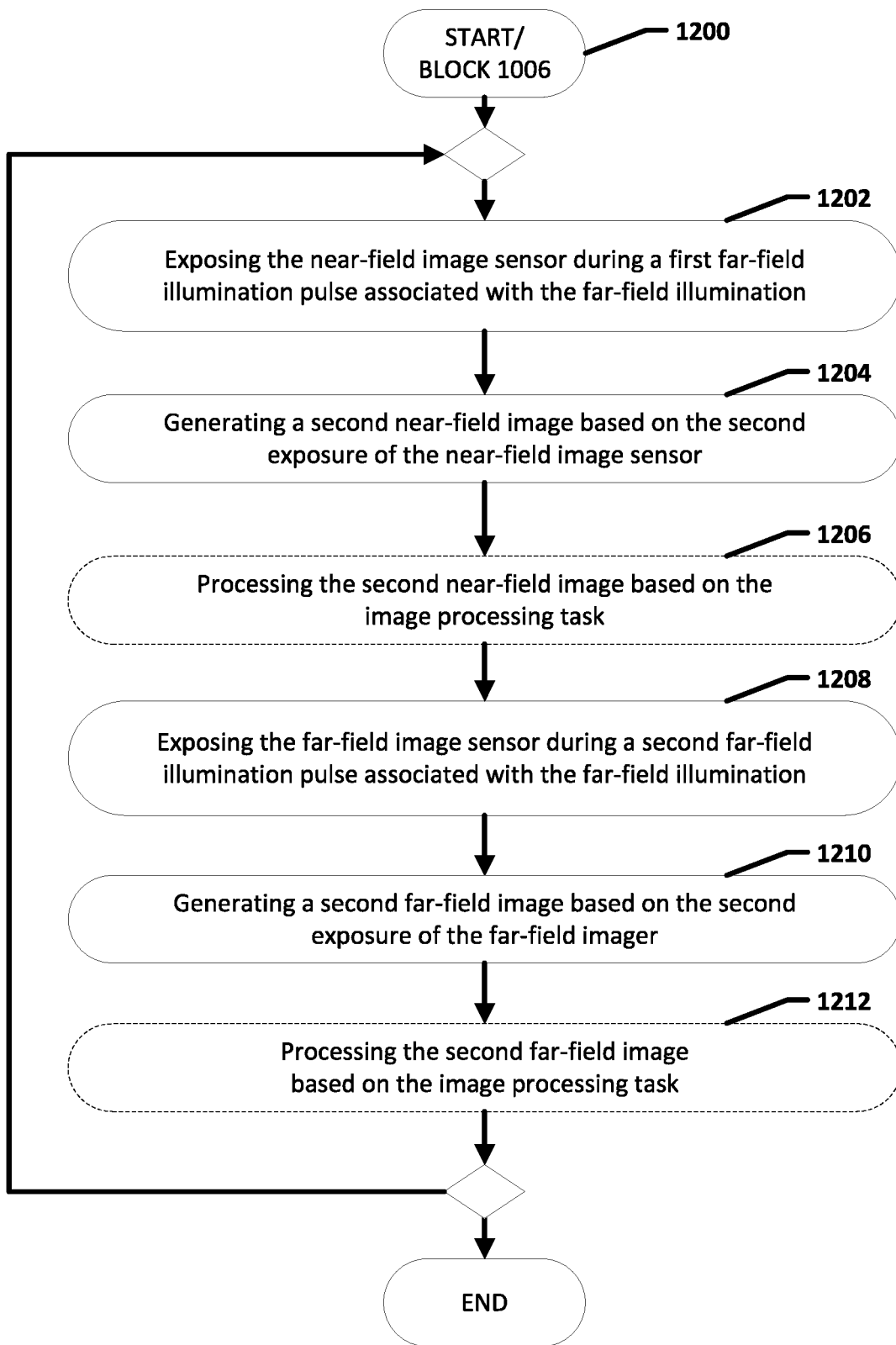
Figure 13:
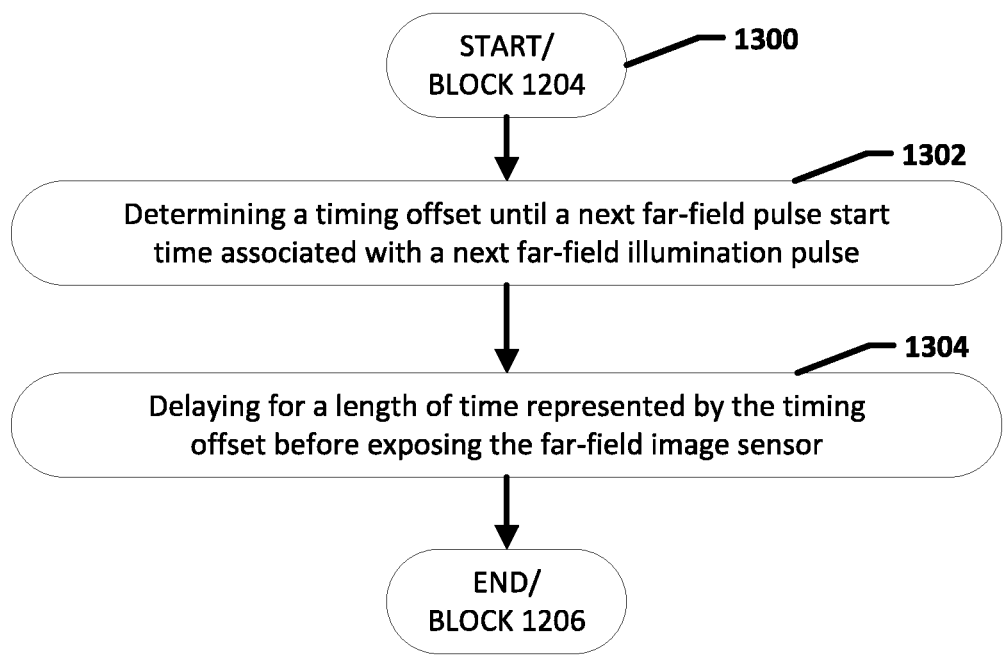
Figure 14:
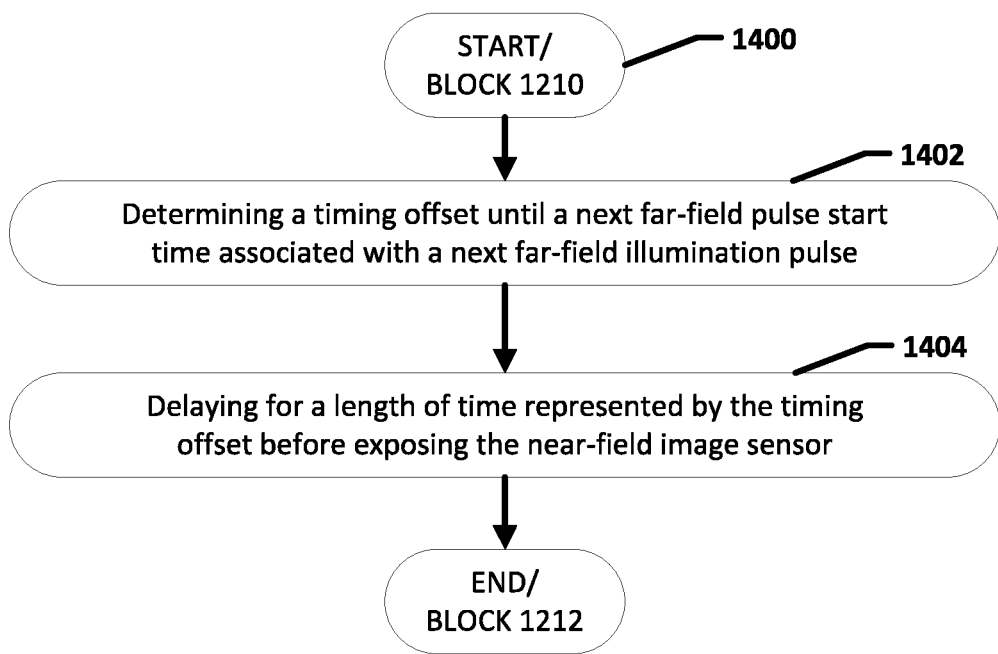
Figure 15:
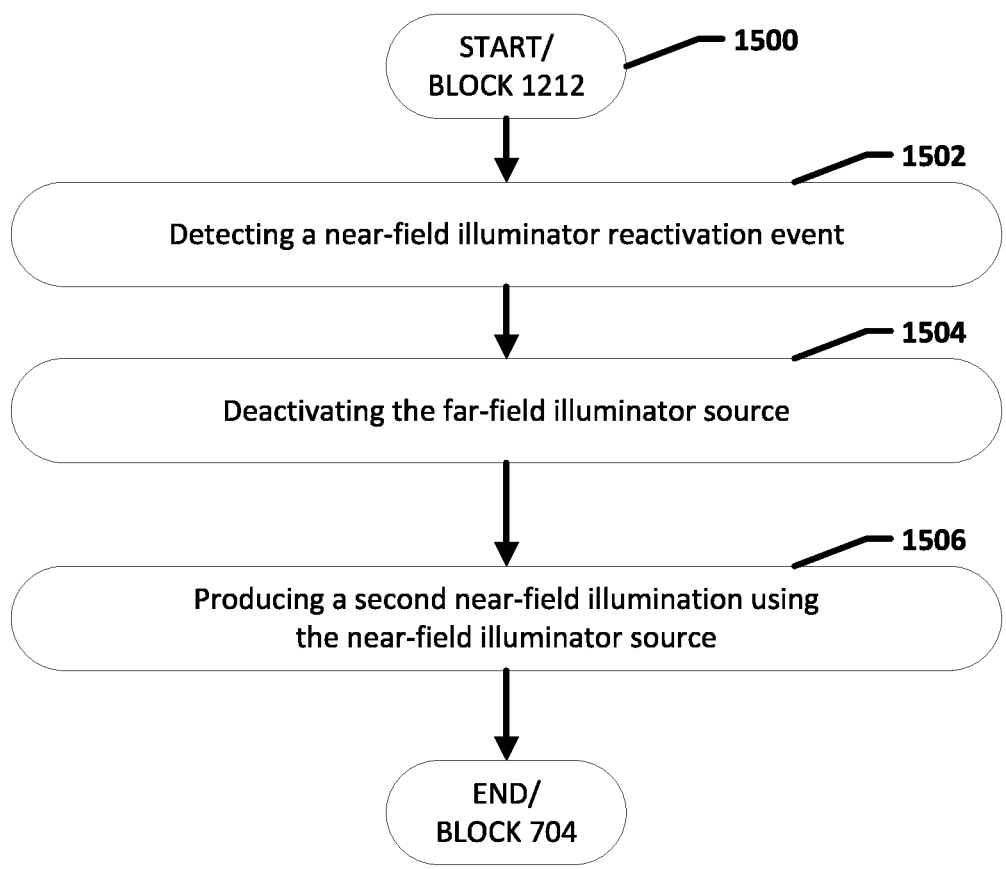

Having thus described the embodiments of the disclosure in general terms, reference now will be made to the accompanying drawings, which are not necessarily drawn to scale, and wherein:

FIG. 1 illustrates a block diagram of an example multi-sensor imaging engine, in accordance with at least one example embodiment of the present disclosure;

FIG. 2 illustrates a block diagram of an example multi-sensor imaging apparatus, in accordance with at least one example embodiment of the present disclosure;

FIG. 3 illustrates a visualization of field of views associated with an example multi-sensor imaging apparatus, in accordance with at least one example embodiment of the present disclosure;

FIG. 4 illustrates a visualization of a first illumination produced by an example multi-sensor imaging apparatus, in accordance with at least one example embodiment of the present disclosure;

FIG. 5 illustrates a visualization of a second illumination produced by an example multi-sensor imaging apparatus, in accordance with at least one example embodiment of the present disclosure;

FIG. 6 illustrates a timing diagram associated with operational functionality of a multi-sensor imaging apparatus, in accordance with at least one example embodiment of the present disclosure;

FIG. 7 illustrates a flowchart depicting example operations of a process for flicker reduction in a multi-imager environment, in accordance with at least one example embodiment of the present disclosure;

FIG. 8 illustrates additional operations for an example process for flicker reduction in a multi-imager environment, specifically for properly aligning exposure of the far-field image sensor, in accordance with at least one example embodiment of the present disclosure;

FIG. 9 illustrates additional operations for an example process for flicker reduction in a multi-imager environment, specifically for properly aligning exposure of the near-field image sensor, in accordance with at least one example embodiment of the present disclosure;

FIG. 10 illustrates additional operations for an example process for flicker reduction in a multi-imager environment, specifically for triggering an illuminator switch event, in accordance with at least one example embodiment of the present disclosure;

FIG. 11 illustrates additional operations for an example process for flicker reduction in a multi-imager environment, specifically for detecting an illuminator switch event, in accordance with at least one example embodiment of the present disclosure;

FIG. 12 illustrates additional operations for an example process for flicker reduction in a multi-imager environment, specifically for capturing images utilizing a far-field illumination, in accordance with at least one example embodiment of the present disclosure;

FIG. 13 illustrates additional operations for an example process for flicker reduction in a multi-imager environment, specifically for properly aligning exposure of the far-field image sensor during the far-field illumination, in accordance with at least one example embodiment of the present disclosure;

FIG. 14 illustrates additional operations for an example process for flicker reduction in a multi-imager environment, specifically for properly aligning exposure of the near-field image sensor during the far-field illumination, in accordance with at least one example embodiment of the present disclosure; and FIG. 15 illustrates additional operations for an example process for flicker reduction in a multi-imager environment, specifically for near-field illuminator reactivation, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Imaging apparatuses, such as barcode scanners, often include a light generation source for illuminating a field of view to be captured by a camera imager in the imaging apparatus. Controlling the illumination of such apparatuses is useful for both providing a visual appearance that is preferable to operators of the device, and that functions safely for the operator. For example, if an illumination pulses within a certain frequency range (e.g., below a certain threshold frequency), the operator could experience headaches and/or seizures from viewing exposure to the illumination. In multi-imager contexts having a plurality of illuminator sources, each illuminator source should be configured accordingly to prevent such negative health effects and undesired visual appearance. Regardless, if illuminators are cycled through and/or otherwise often switched between, the operator may experience a "flickering" that may be undesirable or harmful as well.

Such risks are furthered in circumstances where a plurality of image sensors are connected to a single port for processing, such that streaming modes commonly used for image acquisition cannot be used and instead image sensors are operated in a triggered mode. In this regard, the potential frame rate of each image sensor is reduced at longer exposure times. However, if illuminations were strobed at lower framerates, an undesirable illumination flicker would be visible to the user, and if strobed at a low frequency range, can cause the above-described health problems. Switching image sensors at a low frequency instead may negatively impact the time to read from each image sensor, and thus is not preferable in some contexts.

Further, utilizing a single illuminator may be undesirable or have other negative effects on operation of the imaging apparatus. For example, in small form factor implementations at least one illuminator may reflect sufficient light off of one or more components (such as a front protective window of the apparatus) that hinders operation of one or more image sensors. Additionally or alternatively, at least one illuminator may fail to illuminate a sufficient portion of the field of view to be captured by one or more image sensors. Accordingly, reliance on only a single illuminator or no illuminator at all may result in an ineffective implementation in one or more contexts.

In this regard, embodiments described herein provide for flicker reduction in a multi-imager environment, for example that include a plurality of illuminator sources and a plurality of image sensors. Specifically, embodiments utilize a first illuminator designed for illuminating a first field of view associated with a first image sensor, and capture image(s) utilizing the first image sensor during one or more illumination pulses of the illumination. Embodiments further capture images utilizing a second image sensor, or a plurality of other illuminators, between illumination pulses, such that ambient light from the previous illumination pulse is used for capture without the full illumination pulse. In this regard, such ambient light may sufficiently illuminate a field of view to capture an image having sufficient data for processing without reflection significant enough to hinder capture of the intended field of view by the image sensor.

In some embodiments, one or more events may be triggered indicating circumstances where activation should be switched to a second illuminator. In this regard, the second illuminator may produce a second illumination designed for illuminating a second field of view, for example associated with a second image sensor. In one such example context, the change in illuminator source may be triggered after determining an object to be captured is not detectable within the captured images in a first field of view using ambient light illumination, and thus is likely at a further distance from the imaging apparatus. This change in illuminator source may be triggered in response to detecting one or more events and/or circumstances, for example in response to processing one or more previously captured images to determine a threshold number of images have been captured, and that no object is detectable within the captured images in very low lighting conditions (e.g., below a certain white value threshold). In such circumstances, the change to another illuminator source enables the image sensor to be triggered during the illumination pulses of the newly activated illuminator source to improve the effective reading range of the apparatus. In embodiments having more than two illuminator sources, the same considerations may continue for cycling through more than two illuminator sources, for example narrowing the field of view illuminated by each illuminator and extending the effective range with each cycle. Alternatively, one or more illuminator sources may be skipped, for example where the cycle immediately proceeds from a broadest illuminator source to a narrowest illuminator source without utilizing one or more intermediate illuminator source(s).

Such embodiments provide flicker reduction and/or flicker elimination while enabling effective and efficient capturing of images for processing. Specifically, in this regard, the operation of such embodiments captures images in a manner likely to result in successfully completing an image processing task, such as barcode scanning, while reducing flicker and increasing the likelihood an image is captured within a desired operational time frame that includes data sufficient for successful processing. In this regard, the operational efficiency and effectiveness of the imaging apparatus is maintained or improved while illumination flicker is reduced.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "illuminator source" refers to one or more light generating hardware, devices, and/or components configured to produce an illumination within a desired field of view. Non-limiting examples of an illuminator source includes one or more light emitting diode(s) (LEDs), laser(s), and/or the like.

The term "near-field illuminator source" refers to an illuminator source configured to produce an illumination configured for illuminating a near-field of view associated with a near-field imager. In at least one example context, the near-field illuminator source is configured to produce an illumination in a wider field of view as compared to that of a far-field illuminator source.

The term "far-field illuminator source" refers to an illuminator source configured to produce an illumination configured for illuminating a far-field of view associated with a far-field imager. In at least one example context, the far-field illuminator source is configured to produce an illumination in a narrower field of view as compared to that of a near-field illuminator source.

The term "illumination" refers to one or more light rays produced by an illuminator source within a defined field of view. In at least one example context, the illumination includes one or more illumination pulses produced by a corresponding illuminator source. In some embodiments, an illumination is produced based on a "defined pulse frequency," which refers to a rate at which illumination pulses are produced by a illuminator source. Additionally or alternatively, in some embodiments, an illumination is produced based on a "defined pulse phase," which refers to a period of activation for which an illuminator source is producing a corresponding illumination.

In at least one example context, an illumination comprises any number of illumination pulses, such as one or a plurality of illumination pulses. In at least one such context, an illumination pulse is associated with an "illumination pulse start time," which refers to electronically managed data representing a time at which a corresponding illuminator source will begin producing the illumination pulse. Additionally or alternatively, in at least one such context, an illumination pulse is associated with an "illumination pulse end time," which refers to electronically managed data representing a time at which a corresponding illuminator source will cease producing the illumination pulse.

The term "near-field illumination" refers to a particular illumination produced by a near-field illuminator. In some embodiments, the near-field illumination is associated with illumination of a near field of view captured by a near-field imager. The term "near-field illumination pulse" refers to an illumination pulse of a near-field illumination. In at least one example context, each near-field illumination pulse is associated with at least a "near-field pulse start time" and a "near-field pulse end time."

The term "far-field illumination" refers to a particular illumination produced by a far-field illuminator. In some embodiments, the far-field illumination is associated with illumination of a far field of view captured by a far-field imager. The term "far-field illumination pulse" refers to an illumination pulse of a far-field illumination. In at least one example context, each far-field illumination pulse is associated with at least a "far-field pulse start time" and a "far-field pulse end time."

The term "next pulse" refers to an illumination pulse associated with an illumination pulse start time temporally to occur next. For example, in at least one example context, an illuminator source is configured to activate and produce an illumination pulse for a predetermined length of time, then deactivate to cease producing the illumination pulse for a second predetermined length of time, then producing the next illumination pulse.

During producing of a near-field illumination, the term "next near-field pulse" refers to the next pulse to be produced of the near-field illumination, for example based on a next near-field pulse start time. During producing of a far-field illumination, the term "next far-field pulse" refers to the next pulse to be produced of the far-field illumination, for example based on a next far-field pulse start time.

The term "imager" refers to one or more components configured for capturing an image representing a particular field of view. In at least one example context, an imager includes at least one optical component (e.g., lens(es) and/or associated housing(s)) defining a particular field of view. Additionally or alternatively, in at least one example context, an imager includes an image sensor configured to output an image based on light that engages with the image sensor, such as via the optical components.

The term "near-field imager" refers to an imager configured for capturing an image of a near field of view. In at least one context, the near-field imager comprises at least one near-field optical component(s) defining the near field of view, and a near-field image sensor. The term "near-field image" refers to electronic data generated by the near-field imager that embodies a captured representation of the near field of view.

The term "far-field imager" refers to an imager configured for capturing an image of a far-field of view. In at least one context, the far-field imager comprises at least one far-field optical component(s) defining the far field of view, and a far-field image sensor. The term "far-field image" refers to electronic data generated by the far-field imager that embodies a captured representation of the far field of view.

The term "image sensor" refers to one or more components configured to generate an image represented by a data object based on light incident on the image sensor. In some such example contexts, an image sensor converts light waves that interact with the image sensor into signals representing an image output by the sensor.

The term "exposure time value" refers to electronic data representing a length of time that an image sensor is configured for exposure to oncoming light. In at least one example embodiment, an image sensor of an imager is configured to utilize a variable exposure time that may be set to a particular exposure time value.

The term "gain value" refers to electronic data representing an amplification factor for the signal generated by an image sensor of an imager. In at least one example embodiment, an image sensor of an imager is configured to utilize a variable gain that may be set to a particular gain value.

The term "image property" refers to electronic data embodying one or more characteristics of an image. Non-limiting examples of an image property include an image white level value or other brightness value.

The term "image property threshold" refers to electronic data representing a threshold value that, in a circumstance where a corresponding image property value for a particular image satisfies the threshold value (e.g., by exceeding the threshold value or being lower than the threshold value), indicates one or more determinations.

The term "minimum white level threshold" refers to an example image property threshold representing a minimum white level value that, in a circumstance where a white level value for a particular image is less than the minimum white level value, the image is determined to be deficient.

The term "captured image set" refers to one or more images for processing associated with a particular image processing task, and captured by any number of imagers. In some embodiments, for example, activation alternates between a near-field imager and a far-field imager for capturing the captured image set.

The term "near-illuminator capture threshold" refers to electronic data representing a maximum number of images that, if one or more image properties fail to satisfy a corresponding image property threshold, indicates and/or otherwise triggers a illuminator switch event.

The term "near-aligned" refers to a timestamp that matches, or is within a maximum predetermined time differential from, an associated timestamp. For example, in the context of sensor exposure and illumination pulses, triggering the beginning of exposure of an image sensor can be at a corresponding pulse start time, within a maximum length from the pulse start time (e.g., within pulse_start_time−X and pulse_start_time+X, where X is the maximum predetermined time differential).

The term "illuminator switch event" refers to an electronic determination that a currently activated illuminator source should be deactivated, and a second illuminator source should be activated. In some embodiments, an illuminator switch event only indicates deactivation of a near-field illuminator source and activation of a far-field illuminator source. In other embodiments, an illuminator switch event indicates alternating from activating a near-field illuminator source to activating a far-field illuminator source, or from activating a far-field illuminator to activating a near-field illuminator source.

The term "near-field illuminator reactivation event" refers to an electronic determination that activating a near-field imager after switching activation from the near-field imager to a far-field imager. In some embodiments, for example, once the far-field imager is switched to an activated, the near-field illumination reactivation event is embodied by reactivation of an activation component for the imaging apparatus. In other embodiments, once the far-field imager is switched to and activated, the near-field reactivation event is associated with one or more capture threshold(s) and/or image property threshold(s).

The term "timing offset" refers to electronic data representing a length of time before subsequent activation of an imager after successful readout of an image by the previously activated imager. For example, in an example context where capture alternates between a near-field imager and a far-field imager, the timing offset represents a length of time before activation of the next imager in the alternating cycle. In a circumstance where a far-field imager was last activated, the timing offset may represent a length of time before subsequent activation of the near-field imager.

The term "delay" refers to execution of one or more software, hardware, and/or firmware implemented operations after a predetermined and/or determined length of time. In some embodiments, an embodiment delays execution of one or more operations, processes, and/or sub-processes by waiting (e.g., performing no operations) for a particular time interval, performing one or more alternative and/or parallel operations during the time interval, and/or scheduling execution of the operation after the time interval. In some embodiments, for example in alternating captures between two or more imagers, one or more processing components is configured to delay for a timing offset before activation of a next imager in the alternating cycle.

Example Apparatuses of the Present Disclosure

FIG. 1 illustrates an example multi-sensor imaging engine in accordance with at least one example embodiment of the present disclosure. Specifically, as illustrated, the example multi-sensor imaging engine is embodied by a multi-sensor imaging engine 100. The multi-sensor imaging engine 100 includes a plurality of imagers, specifically a near-field imager and a far-field imager, configured for capturing image data objects in a near field of view associated with the near-field imager and a far field of view associated with the far-field imager. In at least one example context, the multi-sensor imaging engine 100 is configured for capturing images for purposes of barcode reading at different ranges, such as a close-range using the near-field imager and a far-range using the far-field imager.

As illustrated, the multi-sensor imaging engine 100 includes near-field image capture optics 104A. The near-field capture optics 104A may be embodied by one or more lens(es) and/or other optical components configured to enable light to transverse through and interact with a corresponding image sensor, specifically the near-field image sensor 102A. In this regard, the near-field image capture optics 104A may define a particular field of view that may be captured by the near-field image sensor 102A. In some embodiments, the near-field image capture optics 104A defines a near field of view associated with a first focal range, such that objects located at and/or within a determinable offset from the first focal range may be clear in images captured by the near-field image sensor 102A.

Additionally as illustrated, the multi-sensor imaging engine 100 includes far-field image capture optics 104B. The far-field image capture optics 104B may be embodied by one or more len(es) and/or other optical components configured to enable light to transverse through and interact with a corresponding image sensor, specifically the far-field image sensor 102B. In this regard, the far-field image capture optics 104B may define a second field of view that may be captured by the far-field image sensor 102B. In some embodiments, the far-field image capture optics 104B defines a far field of view that is associated with a second focal range, such that objects located at and/or within a determinable offset from the second focal range may be clear in images captured by the far-field image sensor 102B. In some such embodiments, the near field of view is wider than the far field of view, such that the captured data represents more of the environment within view of the multi-sensor imaging engine 100. The far field of view may be narrower than the near field of view, and focused on a further range to enable clearer capture of objects located at a greater range than objects that can be captured clearly in the near field of view.

In some embodiments, for example as illustrated, each imager (or a subset thereof) is associated with one or more components for producing an illumination configured for illuminating the field of view defined by the imager. For example, as illustrated, the multi-sensor imaging engine 100 additionally comprises the near-field illuminator source 106B and corresponding near-field projection optics 108B. The near-field illuminator source 106B is configured to produce light in the direction of the near-field projection optics 108B. This light is refracted through the near-field projection optics 108B to produce a near-field illumination, which may be produced in a desired pattern based on the configuration and design of the near-field projection optics 108B. In this regard, the illumination produced by light exiting the near-field projection optics 108B may illuminate a particular field of view, such as the near field of view capturable by the near-field image sensor 102A. It should be appreciated that in some embodiments, the near-field illuminator source 106B and/or near-field projection optics 108B may be designed such that the near field illumination specifically illuminates the near field of view, and may affect the functioning of the far-field image sensor 102B without negatively affecting the functioning of the near-field image sensor 102A. For example, due at least in part to the close proximity between the components, reflected light may interact with the far-field image sensor 102B and negatively affect the images created via far-field image sensor 102B.

Similarly, the multi-sensor imaging engine 100 additionally comprises the far-field illuminator source 106A and corresponding far-field projection optics 108A. The far-field illuminator source 106A is configured to produce light in the direction of the far-field projection optics 108A. This light is refracted through the far-field projection optics 108A to produce a far-field illumination, which may be produced in a desired pattern based on the configuration and design of the far-field projection optics 108A. In this regard, the far-field illumination may illuminate a particular field of view, such as the far field of view capturable by the far-field image sensor 102B. It should be appreciated that the far-field illuminator source 106A and/or far-field projection optics 108A may be designed such that the far-field illumination specifically illuminates the far field of view without producing sufficient reflections to negatively impact the operations of the near-field image sensor 102A and/or far-field image sensor 102B.

Additionally or alternatively, optionally in some embodiments, the multi-sensor imaging engine 100 further comprises an aimer illuminator source 110. The aimer illumination source 110 is configured to produce light in the direction of the aimer projection optics 112. For example, the aimer illumination source comprises one or more laser diodes and/or high intensity LED(s) configured to produce sufficiently powerful and/or concentrated light. The light is refracted through the aimer projection optics 112 to produce an aimer illumination, which may be produced in a desired pattern based on the configuration and design of the aimer projection optics 112. In one example context, for purposes of barcode scanning for example, the aimer pattern may be produced as a laser line pattern.

The multi-sensor imaging engine 100 further comprises a protective window 114. The protective window 114 comprises one or more optical components configured to enable produced light to exit the engine 100, and incoming light to be received through the image capture optics 104A and 104B to interact with the corresponding image sensors 102A and 102B. In some contexts, the protective window 114 reflects at least a portion of the illumination projected by the far-field projection optics 108A and/or near-field projection optics 108B, and which may interact with the image sensor(s) 102A and/or 102B through light leak or through the corresponding image capture optics 104A and/or 104B. For example, at least a portion of the near field illumination may be reflected towards the far-field image sensor 102B, and negatively affect the operation of the far-field image sensor 102B if triggered when an illumination pulse is occurring. In at least one example context, the far-field illuminator source 106A produces light that is concentrated and/or otherwise sufficiently designed such that the far-field illumination produced by the far-field projection optics 108A is not sufficiently reflected to negatively affect the near-field image sensor 102A.

It should be appreciated that, in other embodiments, a multi-sensor imaging engine may include any number of image capture optics, image sensors, illuminator sources, and/or any combination thereof. In this regard, the engine may be extended to capture any number of field of views, which may each be associated with a corresponding illuminator designed for specifically illuminating a corresponding field of view. One or more of the illuminator source(s) may negatively affect operation of another illuminator. In such circumstances, when one such illuminator source is active, the negatively affected image sensor may be activated between illumination pulses of the illuminator source as described herein. Such operation may be implemented for any combination(s) of illuminator source and image sensor.

In some embodiments, the multi-sensor imaging engine 100 includes one or more processing components (e.g., a processor and/or other processing circuitry) for controlling activation of one or more components of the multi-sensor imaging engine 100. For example, in at least one example embodiment, the multi-sensor imaging engine 100 includes a processor configured for timing the illumination pulses of the near-field illuminator source 106B and/or far-field illumination source 106A, and/or controlling the exposing of the near-field image sensor 102B and/or far-field image sensor 102A. In some such contexts, the processor is embodied by any one of a myriad of processing circuitry implementations, for example as a FPGA, ASIC, microprocessor, CPU, and/or the like. In at least some embodiments, the processor may be in communication with one or more memory device(s) having computer-coded instructions enabling such functionality when executed by the processor(s). In some embodiments, it should be appreciated that the processor may include one or more sub-processors, remote processors (e.g., "cloud" processors) and/or the like, and/or may be in communication with one or more additional processors for performing such functionality. For example, in at least one embodiment, the processor may be in communication, and/or operate in conjunction with, another processor within an imaging apparatus, for example the processor 202 as depicted and described with respect to FIG. 2.

FIG. 2 illustrates an example multi-sensor imaging apparatus, in accordance with at least one example embodiment of the present disclosure. Specifically, FIG. 2 illustrates an example multi-sensor imaging apparatus 200. As illustrated, the multi-sensor imaging apparatus 200 comprises an apparatus chassis 210 for housing the various components of the apparatus. In this regard, it should be appreciated that the apparatus chassis may be embodied in any of a myriad of chassis designs, using any of a myriad of materials, and/or the like, suitable to position the various components of the multi-sensor imaging apparatus 200 for operation. In at least one example context, the apparatus chassis 210 may be embodied as a handheld apparatus chassis, wearable chassis, and/or the like.

The multi-sensor imaging apparatus 200 comprises the multi-sensor imaging engine 100 as described above with respect to FIG. 1. The multi-sensor imaging apparatus 200 further comprises a processor 202. The processor 202 (and/or any other co-processor(s) and/or processing circuitry assisting and/or otherwise associated with the processor 202) may provide processing functionality to the multi-sensor imaging apparatus 200. In this regard, the processor 202 may be embodied in any one of a myriad of ways and may, for example, include one or more processing devices configured to perform independently. Additionally or alternatively, the processor may include one or more processors configured to operate in tandem via a bus to enable independent execution of instructions, pipelining, and/or multi-threading, and/or the like. The use of the terms "processor," "processing module," and/or processing circuitry" may be understood to include a single-core processor, a multi-core processor, multiple processors, microprocessor, other central processing unit ("CPU"), and/or one or more remote or "cloud" processors. In other embodiments, the processor 202 is configured as one or more field-programmable gate array(s) ("FPGA(s)"), application-specific integrated circuit(s) ("ASIC(s)"), and/or the like.

In at least one example embodiment, the processor 202 is configured to provide functionality for operating one or more components of the multi-sensor imaging apparatus 200. For example, the processor 202 may be configured for activating the far-field illuminator source 106A, the near-field illuminator source 106B, and/or the aimer illuminator source 110. Additionally or alternatively, in some embodiments, the processor 202 is configured for activating the near-field image sensor 102A and/or far-field image sensor 102B to expose the corresponding image sensor, and/or for reading out the captured data to generate an image based on the data captured during exposure. Additionally or alternatively, in some embodiments, the processor 202 is configured to process the captured image(s), for example based on one or more image processing task(s). In one such example context, the processor 202 is configured to perform attempt to detect and decode visual indicia(s), such as 1D and/or 2D barcodes, from a captured image. In this regard, the processor 202 may be configured to utilize a visual indicia parsing algorithm and/or a visual indicia decoding algorithm to provide such functionality.

Additionally or alternatively, optionally in at least some embodiments, the multi-sensor imaging apparatus 200 further include activation component 206. The activation component 206 may include hardware, software, firmware, and/or a combination thereof, configured to indicate initiation (and/or termination) of desired functionality by the user. For example, the activation component 206 may transmit an activation signal to cause the processor 202 to begin operation of the multi-sensor imaging engine 200, for example to begin illumination by one or more of the illuminator sources 106A and/or 106B, and/or capture by the image sensors 102A and/or 102B, as described herein. Additionally or alternatively, the activation component 206 may transmit a deactivation signal to the processor 202 to terminate the corresponding functionality, for example to cease scanning via the illuminator(s) and/or image sensor(s). In some embodiments, the activation component 206 is embodied by one or more buttons, triggers, and/or other physical components on the body of the apparatus chassis 210. For example, in at least one example context, the activation component 206 is embodied by one or more "trigger" components that, when engaged by an operator (e.g., when an operator squeezes the trigger), transmits a signal to the processor 202 to initiate corresponding functionality. In some such embodiments, the activation component may transmit a deactivation signal to the processor 202 to cease such functionality when the component is disengaged by the operator (e.g., when the operator releases the trigger). Alternatively or additionally, in at least some embodiments, the activation component 206 is embodied without any components for direct engagement by an operator. For example, the activation component 206 may be embodied by hardware and/or software, or a combination thereof, for detecting the multi-sensor imaging apparatus 200 has been raised and/or positioned to a predefined "scanning" position, and/or lowered from that position to trigger deactivation.

Additionally or alternatively, optionally in at least some embodiments, the dual-imaging apparatus 200 further includes a display 208. The display 208 may be embodied by a LCD, LED, and/or other screen device configured for data provided by one or more components of the apparatus 200. For example, in some embodiments, the display 208 is configured for rendering a user interface comprising text, images, control elements, and/or other data provided by the processor 202 for rendering. In some embodiments, for example, the display 208 is embodied by a LCD and/or LED monitor integrated with the surface of the apparatus chassis 210 and visible to an operator, for example to provide information decoded from a barcode and/or associated with such information decoded from a barcode. In one or more embodiments, the display 208 may be configured to receive user engagement, and/or may transmit one or more corresponding signals to the processor 202 to trigger functionality based on the user engagement. In some such embodiments, the display 208 to provide user interface functionality embodying activation component 206, for example to enable an operator to initiate and/or terminate scanning functionality via interaction with the user interface.

Additionally or alternatively, optionally in at least some embodiments, the dual-imaging apparatus 200 further includes a memory 204. The memory 204 may provide storage functionality, for example to store data processed by the multi-sensor imaging apparatus 200 and/or instructions for providing the functionality described herein. In some embodiments, the processor 202 may be in communication with the memory 204 via a bus for passing information among components of the apparatus, and/or for retrieving instructions for execution. The memory 204 may be non-transitory and may include, for example, one or more volatile and/or non-volatile memories. In other words, for example, the memory 204 may be an electronic storage device (e.g. a computer readable storage medium). The memory 204 may be configured to store information, data, content, applications, instructions, or the like, for enabling the apparatus 200 to carry out various functions in accordance with example embodiments of the present disclosure. In some embodiments, the memory 204 includes computer-coded instructions for execution by the processor 202, for example to execute the functionality described herein and/or in conjunction with hard-coded functionality executed via the processor 202. For example, when the processor 202 is embodied as an executor of software instructions, the instructions may specially configure the processor 202 to perform the algorithms and/or operations described herein when the instructions are executed.

Non-limiting examples implementations of the multi-sensor imaging engine 100 and multi-sensor imaging apparatus 200 are described in U.S. patent application Ser. No. 16/684,124 filed Nov. 14, 2019, titled "INTEGRATED ILLUMINATION-AIMER IMAGING APPARATUSES," the contents of which are incorporated by reference in its entirety herein. It should be appreciated that one or more of such components may be configurable to provide the flicker reduction as described herein.

Example Visualizations of Apparatus Field of Views

FIG. 3 illustrates a visualization of the field of views capturable by an example multi-sensor image apparatus. For example, as illustrated FIG. 3 depicts the near field of view 302 and the far field of view 304 capturable by the multi-sensor imaging apparatus 200. As illustrated, the near field of view 302 is broader than the far field of view, such that more of the environment may be captured within the near field of view 302 than the far field of view 304.

Further, as illustrated, the far field of view 304 extends further than the near field of view 302. In this regard, the narrow nature of the far field of view 304 may enable capture of more detailed representations of a particular portion of the environment as compared to the near field of view 302. In some embodiments, the near field of view 302 and far field of view 304 are capturable by corresponding near field image sensor and a corresponding far field image sensor of the multi-sensor imaging apparatus 200. The near field of view 302 may be associated with a near focal range at a particular distance from the corresponding image sensor in the multi-sensor imaging apparatus 200. Additionally or alternatively, the far field of view 304 may be associated with a far focal range at another distance from the corresponding image sensor in the multi-sensor imaging apparatus 200. In this regard, the near field focal range may be closer than the far-field focal range, such that objects further from the multi-sensor imaging apparatus 200 are in better focus when captured via the far-field image sensor, allowing for an extended range as compared to the near field image sensor.

The multi-sensor imaging apparatus 200 may be configured for providing an illumination specifically for illuminating each of the field of views 302 and 304. In this regard, an illuminator source may be specifically designed to match the field of view of a corresponding image sensor, such that the illumination appropriately illuminates the corresponding field of view without overfill or underfill. Utilizing another illuminator source to produce an illumination and capturing during the non-corresponding image sensor during the illumination, may result in overfilling (e.g., when capturing using a far-field image sensor during a near-field illumination pulse), and/or underfilling (e.g., when capturing using a near-field image sensor during a far-field illumination pulse) that may affect the quality of the data in the captured image, such as due to having too much illumination and/or not enough as described. For example, FIG. 4 illustrates a visualization of a near-field illumination produced by a multi-sensor imaging apparatus, specifically the multi-sensor imaging apparatus 200, in accordance with at least one example embodiment of the present disclosure. In this regard, the near-field illumination 402 may be produced so as to substantially or entirely illuminate the near field of view 302. The near-field illumination 402 may be produced in accordance with an illumination pattern that sufficiently illuminates the entirety of the near-field of view 302 for capturing.

FIG. 5 illustrates a visualization of a far-field illumination produced by an example a multi-sensor imaging apparatus, specifically the multi-sensor imaging apparatus 200, in accordance with at least one example embodiment of the present disclosure. In this regard, the far-field illumination 404 may be produced so as to substantially or entirely illuminate the far field of view 304. The far-field illumination 404 may be produced in accordance with an illumination pattern that sufficiently illuminates the entirety of the far field of view 304 for capturing by a corresponding far-field image sensor. The far-field illumination 404 may illuminate only a percentage of the near-field of view 302, for example a center percentage (e.g., 25%, 50%, or the like) of the near field of view 302. In this regard, the activation of the far-field illumination may be problematic for capturing sufficient images of certain visual indicia, such as those that extend past the boundaries of the far-field of view 304 at a particular distance. Accordingly, utilizing the appropriate illuminator for each image sensor while minimizing flicker and minimizing operational time is desirable to increase the likelihood and efficiency of successful visual indicia detecting and decoding.

Example Timing for Flicker Reduction and Efficient Operation

FIG. 6 illustrates a timing diagram associated with operational functionality of a multi-sensor imaging apparatus, in accordance with at least one example embodiment of the present disclosure. For example, the timing diagram depicted in FIG. 6 includes activation and deactivation timings for the various components of the multi-sensor imaging apparatus 200. In this regard, it should be appreciated that the processor 202, for example, may be configured to enable activation of the various components based on the timing diagram. In at least one example context, the image sensors may be cycled between, for example such that the near-field image sensor 102A and far-field image sensor 102B of the multi-sensor imaging apparatus 200 alternate activation. Each image sensor activation may comprise two steps to capture a corresponding image: exposing the image sensor, and readout from the image sensor.

As illustrated, the timing diagram includes producing of a near-field illumination, for example produced by a near-field illuminator source. The near-field illumination 602 comprises a plurality of illumination pulses. In this regard, the near-field illumination may include an length of active time (e.g., illuminator source on-time), followed by a length of inactive time (e.g., illuminator source off-time). In at least one example context, the multi-sensor imaging apparatus 200 may be configured to produce the near-field illumination 602 with an on-time of 1.5 milliseconds ("ms"), followed by an off-time of 14.5 ms. In this regard, each illumination pulse may begin, last for 1.5 ms, and subsequently end before another illumination pulse begins after 14.5 ms elapses. In some embodiments, this on-time and off-time may similarly be used when activating a far-field illuminator source.

The near-field image sensor and far-field image sensor may each be activated while the near-field illumination is produced. As illustrated, the near-field illuminator may be exposed in near-alignment with the beginning of a near-field illumination pulse. For example, as illustrated, the near-field image sensor exposure 606 begins at the rising edge 606A of the exposure operation 606, which is aligned with the rising edge 604A for the first near-field illumination pulse 604. The illumination pulse 604 subsequently ends at the falling edge 604B, while the exposure of the near-field image sensor 606 ends at the falling edge 606B. In this regard, the near-field image sensor is exposed during the entirety (or near entirety) of the near-field illumination pulse 604, maximizing the likelihood of capturing sufficient data to enable successfully completing an image processing task such as barcode scanning. The position of the near-field illuminator source within the multi-sensor imaging apparatus 200 does not affect the operation of the near-field image sensor, such that the exposure may be performed without negative effects from light reflection, for example, and enabling use of the intended illuminator source to improve the likelihood of successful scanning. As illustrated, the near-field image sensor is subsequently read out to generate and/or process a corresponding image (e.g., a first near-field image). During exposure and/or readout of the near-field image sensor, any other image sensor (such as the far-field image sensor) may not be activatable in any manner, for example because the two image sensors may be controlled by a single port and a switch for controlling one image sensor at a time.

It should be appreciated that, in some embodiments, the illumination pulse may occur during any point in the exposure of an image sensor when it is desired that the image sensor be exposed during the illumination pulse. For example, in a circumstance where the near-field image sensor is to be exposed during the near-field illumination pulse, the exposure may begin before the illumination pulse, the illumination pulse may occur at a later time during the exposure. As one such example, in the context where the near-field image sensor is associated with a 4.5 ms exposure time value, and each illumination pulse lasts 1.5 ms, the exposure of the near-field image sensor could begin at any time between the beginning of the illumination pulse and 3 ms before the illumination pulse start time, such that the entirety of the illumination pulse occurs during the exposure. It should be appreciated that the specific timing may differ for any combination of differently configured image sensor(s) and/or illuminator source(s).

Upon completion of the readout of the near-field image sensor, the multi-sensor imaging apparatus 200 may terminate processing if an image processing task has been successfully completed, for example by successfully detecting and/or decoding a barcode (or other visual indicia) from the captured image. In a circumstance where the image processing task is not successfully completed, the multi-sensor imaging apparatus 200 may proceed to activate another image sensor for performing a subsequent capture. In the example context as illustrated, the multi-sensor imaging apparatus 200 may be configured to alternate activation, such that the far-field image sensor is subsequently activated upon completion of the activation of the near-field image sensor, and visa-versa. As illustrated, the multi-sensor imaging apparatus 200 may initiate exposure of the far-field image sensor 620. To reduce the negative effects of the near-field illumination 602 on the operation of the far-field illuminator (for example due to reflections off of a protective window and/or other components), the far-field image sensor may be exposed between illumination pulses of the near-field illumination 602, for example as indicated by the rising edge and the falling edge of the exposure of the far-field image sensor falling between near-field illumination pulses of the near-field illumination 602. In this regard, far-field image sensor may be exposed only to ambient lighting associated with the previous illumination pulse, for example the illumination pulse 618 as illustrated. After exposure of the far-field image sensor, the far-field image sensor is subsequently read out to generate and/or process a corresponding image (e.g., a first far-field image). Upon completion of the readout of the far-field imager, the multi-sensor imaging apparatus 200 may again terminate processing if an image processing task has been successfully completed, for example by successfully detecting and/or decoding a barcode (or other visual indicia) from the captured far-field image, or continue the capture cycle otherwise.

It should be appreciated that, in some embodiments, the multi-sensor imaging apparatus 200 may be configured to delay exposing one or more sensors such that the sensor is exposed either in alignment with illumination pulses and/or between illumination pulses as desired. For example, as illustrated, the readout of the near-field image sensor ends at the falling edge 626. However, the multi-sensor imaging apparatus 200 may determine that the far-field image sensor cannot subsequently be exposed in time to enable exposure of the far-field image sensor between illumination pulses. Accordingly, the multi-sensor imaging apparatus 200 may determining a timing offset between the falling edge 626 and a subsequent time at which exposure of the far-field image sensor may occur, for example as depicted by the rising edge 628. The multi-sensor imaging apparatus 200 may then delay execution until after the timing offset has elapsed, such that the exposure of the next image sensor occurs within desired circumstances.

The alternating capture cycle may continue for any number of activations, such as until one or more conditions are met. For example, as illustrated, the near-field image sensor may subsequently be activated again for a second exposure 622 such as in circumstances where an image processing task was not successfully completed. The second exposure of the near-field image sensor 622 occurs in near-alignment with a subsequent illumination pulse of the near-field illumination 602. In some such embodiments, to ensure the next exposure of the near-field image sensor is in near-alignment with an illumination pulse, the multi-sensor imaging apparatus 200 may determine another timing offset between the end of the readout of the far-field image sensor, depicted by the falling edge 630, and the beginning of next near-field illumination pulse, depicted by the rising edge 632. The multi-sensor imaging apparatus 200 may delay the exposure until the timing offset elapses, for example by executing other operations, processing captured image(s), scheduling the later execution of one or more instructions for initiating the exposure, suspending execution (e.g., waiting), and/or the like.

Additionally or alternatively, in some embodiments, one or more imagers may be configured upon each activation that does not result in successfully completing an image processing task. For example, in at least some embodiments, the far-field image sensor may be configured for each subsequent activation to improve the likelihood that captured data is sufficient for successful processing. In one such example context, a captured far-field image may be processed to determine whether to increase an exposure time and/or gain associated with the far-field image sensor. In this regard, the exposure time value and/or gain value for the far-field imager may be increased, for example by a flat amount or based on processing the captured far-field image, such as to increase the overall brightness of subsequent captured image(s) for further processing. For example, in at least one embodiment, the multi-sensor imaging apparatus 200 may process a captured far-field image data object to identify a white value for the captured image and compare it to a desired minimum white level threshold, and adjust the exposure time value and/or gain value based on one or more algorithms to result in a white level closer to the desired minimum white level threshold.

In this regard, as illustrated, the far-field image sensor may be exposed for a second time, as depicted by the second far-field image sensor exposure 624. During the second exposure of the far-field image sensor 624, the far-field image sensor is exposed for a longer length of time, for example to increase the white value of the captured image. As described, for the second exposure, the far-field image sensor may additionally or alternatively be configured based on a higher gain value.

The second exposure of the far-field image sensor 624 occurs between illumination pulses of the near-field illumination 602, as depicted by the rising edge and falling edge of the second exposure of the far-field image sensor 624. As illustrated, the exposure time as indicated may represent a maximum exposure time for the far-field image sensor, as the multi-sensor imaging apparatus 200 activates such exposure during the entirety of the time period between two near-field illumination pulses of the near-field illumination 602. In this regard, the far-field image source may not be configurable to increase the exposure time any further without negative effects on the operation of far-field image sensor due to light of a near-field illumination pulse reflected off of one or more components of the multi-sensor imaging apparatus 200.

The multi-sensor imaging apparatus 200 may be configured for detecting an illuminator switch event indicating that the currently active illuminator source should be switched with another illuminator source. For example, in the context of a near-field illuminator source and a far-field illuminator source, the illuminator switch event may indicate that the near-field illuminator source should be deactivated and a far-field illuminator source should be activated. The illuminator switch event may be detected based on any of a number of determinations. For example, in at least one example embodiment, the multi-sensor imaging apparatus 200 may be configured to capture a certain number of images without an image processing task successfully completing before switching illuminator sources. For example, the number of images to be captured before an illuminator switch event is detected may be represented by a stored and/or pre-determined near illuminator capture threshold. Additionally or alternatively, the multi-sensor imaging apparatus 200 may detect an illuminator switch event at least in part due to processing of the captured images and/or configuration settings for the one or more image sensors. For example, in some embodiments, the multi-sensor imaging apparatus 200 is configured to process captured images to determine whether a white level for the image exceeds a certain threshold. In a circumstance, for example, where a number of captured images satisfying the near-illuminator capture threshold have been captured (for example, exceeding the threshold when counting up for each capture), each has been processed to determine that each has a white level value below a minimum white level threshold, and the exposure time value for the image sensor(s) is/are set to exposure time maximum(s) and/or gain value(s) for the image sensor(s) is/are set to gain maximum value(s), the multi-sensor imaging apparatus 200 may detect an illuminator switch event. In some embodiments, one or more other image properties may be processed and compared with an image property threshold to determine whether such properties are within desired ranges. Additionally or alternatively, in at least some embodiments, only images captured by a subset of the image sensor(s), for example only far-field images captured by the far-field image sensor.

The multi-sensor imaging apparatus 200 may detect an illuminator switch event at the time indicated at timestamp 650. For example, the multi-sensor imaging apparatus 200 may be detected in response to each of the captured images falling below a minimum white level threshold, and at least the exposure time value and/or gain value for the far-field image sensor being set to a maximum value. In response, the multi-sensor imaging apparatus 200 may be configured to deactivate the near-field illuminator source, and activate the far-field illuminator source. The far-field illumination 608 comprises a plurality of illumination pulses. In this regard, the far-field illumination 608 may also include a length of active time followed by a length of inactive time. In at least one example context, the illumination pulses may be at a frequency matching the frequency of illumination pulses associated with the near-field illumination 602. In this regard, the far-field illumination may be configured for an on-time of 1.5 ms (e.g., during an illumination pulse), and subsequently end before another illumination pulse begins after 14.5 ms elapses.

Upon activation of the far-field illuminator source, the multi-sensor imaging apparatus 200 may change to a mode to activate the far-field image sensor together in near-alignment with a far-field illumination pulse of the far-field illumination 608. Such exposure in near-alignment with the far-field illumination pulse enable capture of a far-field image during illumination of the far field of view by the far-field illumination pulse. Additionally, the near-field image sensor may similarly be exposed in near-alignment with the far-field illumination pulse without negatively affecting the operation of the far-field image sensor.

For example, as illustrated, the exposure of the near-field image sensor 612 begins in near alignment with the beginning of the first far-field image pulse 610, as depicted by the rising edge 612A of the near-field image sensor exposure and the rising edge 610A of the first far-field illumination pulse 610. In this regard, as illustrated, the near-field image sensor exposure 612 occurs during the first far-field illumination pulse 610, which ends before the end of the near-field image sensor exposure 612, as indicated by the falling edge 612B. In this regard, the operation of the near-field image sensor may function in the same or a similar manner during the far-field illumination 608 as during the near-field illumination 602.

The multi-sensor imaging apparatus 200 may subsequently be configured to delay exposing the far-field image sensor until the far-field image sensor may be aligned with a far-field illumination pulse. The multi-sensor imaging apparatus 200 may be configured to determine a timing offset between the end of the near-field image readout and the next far-field illumination pulse, such as the far-field illumination pulse 616. For example, as depicted, the multi-sensor imaging apparatus 200 may delay the exposure of the near-field image sensor until the timing offset has elapsed, and begin exposure of the far-field image sensor 614 in near-alignment with the far-field illumination pulse 616, as depicted by the rising edge of the far-field illumination pulse 616 and rising edge of the exposure of the far-field image sensor 614. In this regard, the far-field image sensor may be used to capture far-field images during illumination by the far-field illumination pulses. In this regard, in a second mode after an illuminator switch event, the multi-sensor imaging apparatus 200 may operate the far-field image sensor similar to that of the near-field image sensor by aligning both with produced far-field illumination pulses.

The timing of the illumination pulse(s) and/or corresponding exposure may be determined in any one of a myriad of ways. For example, in at least one example embodiment, the timings for activation of the illumination pulse(s) and/or image sensor exposure(s) may be predetermined and/or hard-coded for execution by one or more associated processor(s). Additionally or alternatively, in some embodiments, a timing offset until a next illumination pulse may be determined based on the pulse frequency for the produced illumination, and/or an initial time (e.g., a time at which a first illumination pulse was produced). The exposure of one or more image sensors may be appropriately timed based on a known and/or determinable current time, an illumination pulse frequency, the determined offset, and/or the exposure time value for the image sensor to be exposed. For example, based on such data, exposure of an image sensor may be triggered such that the image sensor remains exposed for the entirety of an illumination pulse in some circumstances, and/or remains exposed entirely or partially between illumination pulses in other circumstances.

By minimizing switching between illuminator sources, such embodiments reduce flicker while enabling efficient and effective functionality of both image sensors. Each illuminator source is utilized to illuminate a desired field of view for capture by corresponding image sensor(s), increasing the likelihood of successfully completing an image processing task such as barcode scanning. In this regard, flicker remains reduced without impacting the operational functionality of the multi-sensor imaging apparatus 200.

Example Processes of the Present Disclosure

Having described example apparatuses and visualizations associated with embodiments of the present disclosure, example flowcharts including various operations performed by the above described apparatus(es) will now be discussed. It should be appreciated that each of the flowcharts depicts an example processes that may be performed by one or more components of the above described apparatuses. The blocked operations of each process may be arranged in any of a number of ways, as depicted and described herein. In some embodiments one or more operations of a first process may occur in-between one or more operations, or otherwise operate as a sub-process, of a second process. Additionally or alternatively, the process may include some or all of the steps described and/or depicted, including one or more optional operations in some embodiments. In regards to the below described flowcharts, one or more of the depicted operations may be optional in some, or all, embodiments of the present disclosure. Optional operations are depicted with broken (or "dashed") lines. Similarly, it should be appreciated that one or more of the operations of each flowcharts may be combinable, replaceable, and/or otherwise altered as described herein.

FIG. 7 illustrates an example process for flicker reduction in a multi-imager environment, in accordance with at least one example embodiment of the present disclosure. In this regard, the example process 700 may be performed by one or more specially configured apparatuses, such as the multi-sensor imaging apparatus 200. In this regard, in some such embodiments, the multi-sensor imaging apparatus 200 may be configured to perform one or more of the operations described herein utilizing one or more of the components therein, such as the processor 202, memory 204, and/or multi-sensor imaging engine 100. In some such embodiments, the multi-sensor imaging apparatus 200 is configured for performing one or more of the operations as depicted and described by executing computer program instructions stored therein, for example in the memory 204.

The process 700 begins at operation 702. At operation 702, the process 700 includes producing, utilizing a near-field illuminator source, a near-field illumination comprising at least one near-field illumination pulse. In some such embodiments, one or more activation signal(s) may be transmitted to the near-field illuminator source to begin producing the near-field illumination. It should be appreciated that the near-field illumination may include near-field illumination pulses based on a defined frequency and/or a defined pulse phase, thus defining the amount of time which an illumination pulse is produced and time between such illumination pulses. In some embodiments, a single signal is transmitted to trigger the near-field illuminator source to produce the illumination pulses based on the defined frequency and/or defined pulse phase. In other embodiments, a signal may be transmitted to the near-field illuminator source to trigger each near-field illumination pulse based on the defined frequency and/or defined pulse phase.

At operation 704, the process 700 includes exposing a near-field image sensor during a first near-field illumination pulse. In some embodiments, the near-field image sensor is exposed at any time during the first near-field illumination pulse. For example, the exposure of the near-field image sensor may begin at some point in time before the first near-field illumination pulse, or in some embodiments after the first near-field illumination pulse has already begun. In at least one circumstance where the exposure time value for the near-field image sensor is shorter than the on-time for the first near-field illumination pulse, the exposure of the near-field image sensor may begin after the beginning of the near-field illumination pulse. It should be appreciated that the illuminator source(s) and/or image sensor(s) may be controlled by one or more processors, such as the processor 202 and/or a processor internal to the multi-sensor imaging engine 100.

In an at least one embodiment, exposing a near-field image sensor beginning in near-alignment with a first near-field illumination pulse start time associated with a first near-field illumination pulse. In some embodiments, for example, the processor 202 may determine a timestamp at which the next near-field illumination pulse will begin, and delay until in near-alignment with the next near-field illumination pulse. In some embodiments, the exposure begins in alignment (e.g., at the same time) as the beginning of the first illumination pulse. Alternatively or additionally, in at least some embodiments, the exposure begins within an acceptable range from the beginning of the first near-field illumination pulse. In at least some embodiments, the exposure of the near-field image sensor begins in response to one or more signals transmitted to the near-field image sensor, for example an activation signal.

At operation 706, the process 700 includes generating a near-field image based on the exposure of the near-field image sensor. In this regard, the near-field image may be read out from the near-field image sensor. The near-field image may represent light captured by the near-field image sensor during exposure, for example which may embodies a representation of a near field of view illuminated by the first near-field illumination pulse. In some embodiments, the near-field image is output in any one of a myriad of image formats, for example as a PNG, JPG, and/or the like.

At optional operation 708, the process 700 includes processing the near-field image based on an image processing task. In some embodiments, for example, the processor 202 is configured to process the near-field image for attempting to detect a visual indicia represented within the near-field image, such as a 1D or 2D barcode. In one such example embodiment, the near-field image is processed utilizing at least a visual indicia detection algorithm to parse and/or otherwise detect a visual indicia represented within the near-field image, for example one or more barcode detection algorithm(s) known in the art. Additionally or alternatively, in at least some embodiments, the near-field image is processed for attempting to decode a detected visual indicia represented within the near-field image. For example, in one such example embodiment, the detected visual indicia is decoded utilizing at least a visual indicia decoding algorithm to retrieve data encoded by the detected visual indicia, for example one or more barcode decoding algorithm(s) known in the art.

Additionally or alternatively, in at least one example embodiment, the near-field image is further processed for purposes of determining whether one or more determined circumstances are met. For example, in at least some embodiments, the near-field image is processed to determine an image property value for one or more image properties associated with the near-field image. Additionally or alternatively, the image property value may be compared with one or more corresponding image property threshold values. In one such example context, the near-field image is processed to determine a white level value associated with the near-field image, and/or the white level value may be compared with a minimum white level threshold to determine whether the white level value for the captured near-field image satisfies the minimum white level threshold. In some such embodiments, the multi-sensor imaging apparatus 200 is configured to maintain and/or otherwise track the number of captured images, whether such images are associated with one or more image property value(s) that satisfy and/or do not satisfy corresponding image property threshold(s), and/or store each capture image to derive one or more of such values or associated values therefrom.

At operation 710, the process 700 includes exposing a far-field image sensor such that the exposure of the far-field image sensor is not during a near-field illumination pulse of the near-field illumination. In this regard, the far-field image sensor may be exposed for a duration between two near-field illumination pulses of the near-field illumination. In this example context, the far-field image sensor may be exposed only to ambient lighting generated associated with the near-field illumination. For example, ambient lighting from a previous near-field illumination pulse may interact with the far-field image without negative effects from reflections that may be present during the near-field illumination pulse. In some embodiments, the exposure begins in near-alignment with the end of a near-field illumination pulse, such as at the same time as the end of the near-field illumination pulse or within a predetermined acceptable time after the near-field illumination pulse ends. Additionally or alternatively, in at least some contexts, the exposure begins much after the near-field illumination pulse ends such that the exposure time does not overlap with a subsequent illumination pulse.

At operation 712, the process 700 includes generating a far-field image based on the exposure of the far-field image sensor. In this regard, the far-field image may be read out from the far-field image sensor after the exposure time for the far-field image sensor elapses. The far-field image may represent light captured by the far-field image sensor during exposure, for example which may embody a representation of a far field of view illuminated by the ambient light of a previous near-field illumination pulse. In some embodiments, the far-field image is output in any one of a myriad of image formats, for example as a PNG, JPG, and/or the like. It should be appreciated that the near-field image and the far-field image may be output in the same format or in different formats.

At optional operation 714, the process 700 includes processing the far-field image based on the image processing task. Similar to processing the near-field image for example, the processor 202 is configured to process the far-field image for attempting to detect a visual indicia represented within the far-field image. Additionally or alternatively, in at least one example context, the far-field image is processed for attempting to decode a detected visual indicia. As described, the far-field image may be processed utilizing at least a visual indicia detection algorithm and/or visual indicia decoding algorithm to provide such functionality.

Additionally or alternatively, in at least one example embodiment, the far-field image is further processed for purposes of determining whether one or more determined circumstances are met. For example, in at least one embodiment, the far-field image is processed to determine an image property value for one or more image properties associated with the near-field image. Additionally or alternatively, the image property value may be compared with one or more corresponding image property threshold values. In one such example context, the far-field image is processed to determine a white level value associated with the far-field image, and/or the white level value may be compared with a minimum white level threshold to determine whether the white level value for the captured near-field image satisfies the minimum white level threshold. The captured far-field image and/or data representing the results of one or more associated determinations may similarly be stored in one or more data objects embodying a number of captured images, whether such images are associated with one or more image property value(s) that satisfy and/or do not satisfy corresponding image property threshold(s), and/or store each capture image to derive one or more of such values or associated values therefrom.

At optional operation 716, the process 700 includes altering at least one of an exposure time value for the far-field image sensor, and/or a gain value for the far-field image sensor. In some embodiments, the multi-sensor imaging apparatus 200 may alter the exposure time value and/or the gain value for the far-field image sensor in response to determining a white level value does not satisfy a corresponding white value threshold. In this regard, the multi-sensor imaging apparatus 200 may determine that the captured far-field image is not brighter than a desired brightness (e.g., represented by the white value threshold), and thus that an increased exposure time and/or gain value may be used to increase the brightness of images captured by the far-field image sensor. In at least one embodiment, one or more exposure time generation algorithm(s) and/or gain value generation algorithm(s) is/are utilized to determine the updated exposure time value and/or gain value for setting the far-field image sensor. In at least one embodiment, the processor 202 transmits one or more signals to the far-field image sensor to alter the exposure time value and/or the gain value for the far-field image sensor by configuring such settings to an updated value.

It should be appreciated that, in some contexts, the capture cycle may begin with the far-field image sensor, and in other contexts the capture cycle may begin with the near-field image sensor. For example, in some embodiments, the capture cycle is predetermined to always begin with one of the near-field image sensor or far-field image sensor. In other embodiments, the capture cycle is initialized using an image sensor that was previously utilized in capturing an image that was processed to successfully complete an image processing task. For example, the capture cycle may begin with the image sensor that last captured an image from which a barcode was successfully detected and decoded. In some such embodiments, the multi-sensor imaging apparatus 200 may be configured for tracking the image sensor that was last utilized for capturing an image that was successfully processed.

It should be appreciated that, in at least some embodiments, a capture cycle may continue for any number of captures. For example, in the context where captures alternate between the far-field image sensor and the near-field image sensor, flow may return to operation 704. In other embodiments, the near-field image sensor and/or far-field image sensor may be utilized to capture any number of images before alternating to capture via the other image sensor. For example, in one such example embodiment, a plurality of near-field images may be captured (e.g., three near-field images) before alternating to the far-field image sensor for capture. In this regard, it should be appreciated that the near-field illumination may similarly continue for any number of illumination pulses.

FIG. 8 illustrates additional operations for an example process for flicker reduction in a multi-imager environment, specifically for properly aligning exposure of the far-field image sensor during a near-field illumination, in accordance with at least one example embodiment of the present disclosure. In this regard, the example process 800 may be performed by one or more specially configured apparatuses, such as the multi-sensor imaging apparatus 200. In this regard, in some such embodiments, the multi-sensor imaging apparatus 200 may be configured to perform one or more of the operations described herein utilizing one or more of the components therein, such as the processor 202, memory 204, and/or multi-sensor imaging engine 100. In some such embodiments, the multi-sensor imaging apparatus 200 is configured for performing one or more of the operations as depicted and described by executing computer program instructions stored therein, for example stored in the memory 204.

In some embodiments, the process 800 is performed additional to, and/or in replacement of, one or more operations depicted and described with respect to another process herein. For example, as illustrated, in some embodiments the process 800 begins after operation 706 as depicted and described above with respect to FIG. 7. Additionally or alternatively, in at least some embodiments, at the conclusion of the process 800 flow returns to one or more operations depicted and described with respect to another process herein. For example, as illustrated, in some embodiments, the flow returns to operation 708 as depicted and described with respect to FIG. 7 upon conclusion of the process 800.

The process 800 begins at operation 802. At operation 802, the process 800 includes determining a timing offset until a next near-field pulse start time associated with a next near-field illumination pulse. In this regard, the timing offset may represent the length of time until a next near-field illumination pulse begins. In some embodiments, the next near-field pulse start time is determined based on the pulse frequency and/or pulse phase associated with the configured near-field illumination pulse. It should be appreciated that, in at least some embodiments, the timing offset is determinable based on the pulse frequency, a previous near-field pulse start time and/or end time, a far-field sensor exposure time and/or readout time, and/or a combination thereof.

At decision operation 804, the process 800 includes determining whether the timing offset exceeds the exposure time associated with the far-field image sensor. In some such embodiments, the timing offset may be compared with the exposure time to determine whether the exposure time exceeds, matches, or is less than the exposure time associated with the far-field image sensor. In this regard, the multi-sensor imaging apparatus 200 may be configured to determine the current exposure time value for the far-field image sensor. For example, in at least one example embodiment, the processor 202 is configured to transmit one or more signals requesting the current exposure time value from the far-field image sensor. In other embodiments, the processor 202 is configured to track and/or otherwise maintain the current exposure time value for the far-field image sensor as it is set.

By determining whether the timing offset exceeds the exposure time associated with the far-field image sensor, the multi-sensor imaging apparatus 200 may be configured to perform an appropriate delay action based on the determination. In some embodiments, in a circumstance where the determination indicates the timing offset does exceed the exposure time, flow continues to operation 806. At operation 806, the process 800 includes proceeding with exposing the far-field image sensor. In this regard, the determination indicates that sufficient time remains to expose the far-field image sensor without exposing the far-field image sensor during a near-field illumination pulse. Accordingly, the far-field image sensor may be exposed immediately (or with minimal delay associated with execution of program instructions) without requiring any delay to improve responsiveness of the embodiment. In some such embodiments, the flow may immediately continue to exposing the far-field image sensor, for example returning to operation 708 as illustrated.

In some embodiments in a circumstance where the determination indicates the timing offset does not exceed the exposure time, flow continues to operation 808. At operation 808, the process 800 includes delaying for a length of time represented by the timing offset combined with the difference between the next near-field pulse start time and a next near-field pulse end time associated with the next near-field illumination pulse. The difference between the next near-field pulse start time and a next near-field pulse end time may be identified based on a pulse frequency, and/or calculated based on a determined start time and end time. In this regard, the exposure of the far-field image sensor may begin only after sufficient delay to ensure that an upcoming near-field illumination pulse has ended, and thus will not negatively affect operation of the far-field image sensor. In some embodiments, the timing offset is combined (e.g., added) with the on-time of the illumination pulse to determine a complete timing offset to delay. The multi-sensor imaging apparatus 200 may be configured to delay in any of a myriad of manners, for example by executing other instructions and/or processes during that time, suspending execution of instructions, and/or otherwise scheduling a delayed execution after the length of time has elapsed. Upon completion of the delay, the flow may continue to a subsequent operation, for example returning to operation 708 as illustrated.

FIG. 9 illustrates additional operations for an example process for flicker reduction in a multi-imager environment, specifically for properly aligning exposure of the near-field image sensor, in accordance with at least one example embodiment of the present disclosure. In this regard, the example process 800 may be performed by one or more specially configured apparatuses, such as the multi-sensor imaging apparatus 200. In this regard, in some such embodiments, the multi-sensor imaging apparatus 200 may be configured to perform one or more of the operations described herein utilizing one or more of the components therein, such as the processor 202, memory 204, and/or multi-sensor imaging engine 100. In some such embodiments, the multi-sensor imaging apparatus 200 is configured for performing one or more of the operations as depicted and described by executing computer program instructions stored therein, for example stored in the memory 204.

In some embodiments, the process 900 is performed additional to, and/or in replacement of, one or more operations depicted and described with respect to another process herein. For example, as illustrated, in some embodiments the process 900 begins after operation 712 as depicted and described above with respect to FIG. 7. Additionally or alternatively, in at least some embodiments, at the conclusion of the process 900 flow returns to one or more operations depicted and described with respect to another process herein. For example, as illustrated, in some embodiments, the flow returns to operation 714 as depicted and described with respect to FIG. 7 upon conclusion of the process 900.

The process 900 begins at operation 902. At operation 902, the process 900 includes determining a timing offset until a next near-field pulse start time associated with a next near-field illumination pulse. In this regard, the timing offset may represent the length of time until a next near-field illumination pulse begins. In some embodiments, the next near-field pulse start time is determined based on the pulse frequency and/or pulse phase associated with the configured near-field illumination pulse. It should be appreciated that, in at least some embodiments, the timing offset is determinable based on the pulse frequency, a previous near-field pulse start time and/or end time, a far-field sensor exposure time and/or readout time, and/or a combination thereof. In some embodiments, the multi-sensor imaging apparatus 200 is configured to track the time remaining until a next illumination pulse after each near-field illumination pulse.

At operation 904, the process 900 includes proceeding with exposing the far-field image sensor. In this regard, the determination indicates that sufficient time remains to expose the far-field image sensor without exposing the far-field image sensor during a near-field illumination pulse. Accordingly, the far-field image sensor may be exposed immediately (or with minimal delay associated with execution of program instructions) without requiring any delay to improve responsiveness of the embodiment. In some such embodiments, the flow may immediately continue to exposing the far-field image sensor, for example returning to operation 708 as illustrated.

At operation 904, the process 900 includes delaying for a length of time represented by the timing offset before exposing the near-field image sensor. In this regard, the exposure of the near-field image sensor may begin in near-alignment with the next near-field illumination pulse, for example at the same time as activation of the next near-field illumination pulse and/or within a predetermined offset from the activation of the near-field illumination pulse. In some such embodiments, some or all of the exposure may occur during the near-field illumination pulse such that the near-field image sensor captures a near field of view illuminated by the near-field illumination pulse. It should be appreciated that, in some contexts where the readout of the far-field image sensor is completed immediately before and/or within a predetermined offset from the next near-field pulse start time for the next near-field illumination pulse, no delay may be necessary. As described, the multi-sensor imaging apparatus 200 may be configured to delay in any of a myriad of manners, for example by executing other instructions and/or processes during that time, suspending execution of instructions, and/or otherwise scheduling a delayed execution after the length of time has elapsed. Upon completion of the delay, the flow may continue to a subsequent operation, for example returning to operation 714 as illustrated for exposing the near-field image sensor.

FIG. 10 illustrates additional operations for an example process for flicker reduction in a multi-imager environment, specifically for triggering an illuminator switch event, in accordance with at least one example embodiment of the present disclosure. In this regard, the example process 1000 may be performed by one or more specially configured apparatuses, such as the multi-sensor imaging apparatus 200. In this regard, in some such embodiments, the multi-sensor imaging apparatus 200 may be configured to perform one or more of the operations described herein utilizing one or more of the components therein, such as the processor 202, memory 204, and/or multi-sensor imaging engine 100. In some such embodiments, the multi-sensor imaging apparatus 200 is configured for performing one or more of the operations as depicted and described by executing computer program instructions stored therein, for example stored in the memory 204.

In some embodiments, the process 1000 is performed additional to, and/or in replacement of, one or more operations depicted and described with respect to another process herein. For example, as illustrated, in some embodiments the process 1000 begins after operation 714 as depicted and described above with respect to FIG. 7. Additionally or alternatively, in at least some embodiments, at the conclusion of the process 1000 flow returns to one or more operations depicted and described with respect to another process herein. For example, as illustrated, in some embodiments, the flow continues to one or more operations as depicted and described with respect to FIG. 12 upon conclusion of the process 1000, such as for capturing images during production of the far-field illumination.

The process 1000 begins at operation 1002. At operation 1002, the process 1000 includes detecting an illuminator switch event. In this regard, the multi-sensor imaging apparatus 200 may detect one or more circumstances indicating another illuminator source, such as a far-field illuminator source, should be activated and the currently active illuminator source, such as the near-field illuminator source, should be deactivated. It should be appreciated that the illuminator switch event may be detected utilizing any of myriad of determinations, processes, and/or the like. In some embodiments, for example, the illuminator switch event is detected based at least on an elapsed activation time, for example such that the illuminator source is switched after a near-field illuminator activation threshold elapses. Additionally or alternatively, for example, in some embodiments the illuminator switch event is detected based at least on a number of captured images, and/or one or more image properties (e.g., a white level value) associated with captured images and/or a subset thereof (e.g., all captured images or only far-field images). Additionally or alternatively still, in at least some embodiments the illuminator switch event is detected based at least on one more configurations of at least one of the image sensor(s), for example based on the exposure time value and/or gain value for the far-field image sensor to determine whether such configurations are set to a maximum value. In other embodiments, the illuminator switch event is detected utilizing one or more object detection algorithm(s), trained machine learning model(s), statistical analysis model(s), and/or artificial intelligence model(s) (for example, detecting that an object is likely present in the captured image, such as at a further range or in a field of view that would be better illuminated by an alternative illuminator source). One example process for detecting an illuminator switch event is described further herein with respect to FIG. 11.

At operation 1004, the process 1000 includes deactivating the near-field illuminator source. In this regard, by deactivating the near-field illuminator source, the near-field illuminator source ceases producing near-field illumination pulses until reactivated (if reactivated). In some embodiments, one or more signals is/are transmitted to deactivate the near-field illumination source. For example, in at least one example embodiment, the processor 202 is configured to transmit a deactivation signal to the near-field illuminator source to cause deactivation of the near-field illuminator source.

At operation 1006, the process 1000 includes producing, using a far-field illuminator source, a far-field illumination associated with at least one far-field illumination pulse. In some such embodiments, one or more activation signal(s) may be transmitted to the far-field illuminator source producing the far-field illumination. For example, in at least one example embodiment, the processor 202 may generate and/or transmit one or more activation signal(s) to the far-field illuminator source. It should be appreciated that the far-field illumination may include far-field illumination pulses based on a defined frequency and/or a defined pulse phase, thus defining the amount of time which an illumination pulse is produced and the time between such illumination pulses. In some such embodiments, the defined frequency and/or defined pulse phase associated with the far-field illuminator source may match the defined frequency and/or defined pulse phase associated with the near-field illuminator source, such that the far-field illumination pulses are produced at the same rate and for the same length as the near-field illumination pulses. In other embodiments, the defined frequency and/or defined pulse phase associated with the near-field illuminator source differs from the defined frequency and/or defined pulse phase associated with the far-field illuminator source. In some embodiments, a single signal is transmitted to trigger the far-field illuminator source to produce the illumination pulses based on the defined frequency and/or define pulse phase. In other embodiments, a signal may be transmitted to the far-field illuminator source to trigger each far-field illumination pulse based on the defined frequency and/or defined pulse phase.

FIG. 11 illustrates additional operations for an example process for flicker reduction in a multi-imager environment, specifically for detecting an illuminator switch event, in accordance with at least one example embodiment of the present disclosure. In this regard, the example process 1100 may be performed by one or more specially configured apparatuses, such as the multi-sensor imaging apparatus 200. In this regard, in some such embodiments, the multi-sensor imaging apparatus 200 may be configured to perform one or more of the operations described herein utilizing one or more of the components therein, such as the processor 202, memory 204, and/or multi-sensor imaging engine 100. In some such embodiments, the multi-sensor imaging apparatus 200 is configured for performing one or more of the operations as depicted and described by executing computer program instructions stored therein, for example stored in the memory 204.

In some embodiments, the process 1100 is performed additional to, and/or in replacement of, one or more operations depicted and described with respect to another process herein. For example, as illustrated, in some embodiments the process 1100 begins at the start of the process 1000, for example after operation 714 as depicted and described above with respect to FIG. 10. Additionally or alternatively, in at least some embodiments, at the conclusion of the process 1100 flow returns to one or more operations depicted and described with respect to another process herein. For example, as illustrated, in some embodiments, the flow returns to operation 1004 as depicted and described with respect to FIG. 10 upon conclusion of the process 1100. In this regard, in some such embodiments, the process 1100 supplants the operation 1002, and/or one or more associated operations. In some embodiments, a subset of the operations depicted with respect to the process 1100 are performed, for example only operations 1102 and 1104, operations 1102 and 1106, and/or only operations 1104 and 1106. In other embodiments, each of the optional operations as depicted are performed.

The process 1100 begins at operation 1102. At optional operation 1102, the process 1100 includes determining each captured image of a captured image set is associated with an image property that does not satisfy an image property threshold. In some embodiments, the captured image set may include each captured image from all image sensors, for example such that the captured image set includes all near-field images and far-field imagers in the context of the multi-sensor imaging apparatus 200. In other embodiments, the captured image set includes images captured via only one of the image sensors, such as only the near-field images for processing and/or only the far-field images for processing. It should be appreciated that, in some embodiments, the multi-sensor imaging apparatus 200 is configured to store the captured images in the captured image set as each image is captured, and/or processes the captured image and discards it after processing such that subsequent storage of the captured image is not required.

The multi-sensor imaging apparatus 200 may similarly be preconfigured to include image property threshold(s) for one or more image properties. Alternatively or additionally, in some embodiments, the multi-sensor imaging apparatus 200 is configured to determine the image property threshold(s) associated with one or more image properties, for example based on data within and/or associated with the captured images. In some such embodiments, the value for the image property may be compared to the image property threshold to determine whether the image property satisfies the image property threshold (e.g., to test whether the image property value exceeds, meets, or falls below the image property threshold). In some embodiments, the image property satisfies the image property threshold when the image property value for exceeds the image property threshold. In at least one example context, the multi-sensor imaging apparatus 200 is configured to determine that each captured image is associated with at least a white level value that does not satisfy a corresponding minimum white level threshold. In this regard, such captured images may be determined to be insufficiently illuminated in circumstances where the white level value for the captured image does not satisfy the minimum white level threshold, and/or when no barcode and/or other visual indicia can be detected and/or decoded from the captured image. It should be appreciated that such determinations may also be utilized in triggering altering of one or more configurations for a corresponding image sensor to attempt to alter the white level value of subsequent captured images using the corresponding image sensor. In some embodiments, one or more configurations of the far-field image sensor are configured in response to such determinations associated with captured far-field image(s), for example the process may include altering an exposure time value and/or gain value for the far-field image sensor based on the processing of a white level value for one or more captured far-field images. Similarly, in at least one embodiment, one or more configurations of the far-field image sensor are configured in response to such determinations associated with captured near-field image(s), for example the process may include altering an exposure time value and/or gain value for the near-field image sensor based on the processing of a white level value for one or more captured near-field image(s). In some embodiments, the exposure time value and/or gain value for the near-field image sensor and/or far-field image sensor may be set to a value below and/or equal to one or more corresponding maximum values, such as a maximum exposure time value and/or maximum gain value for the far-field image sensor and a maximum exposure time value and/or maximum gain value for the near-field imager. It should be appreciated that any of a number of other image properties may be compared to determine whether such image properties satisfy a corresponding image property threshold.

At optional operation 1104, the process 1100 includes determining a number of captured images associated with the captured image set satisfies a near-illuminator capture threshold. In this regard, the near-field illuminator capture threshold may embody a value representing the maximum number of images that may be captured before the multi-sensor imaging apparatus 200 detects an illuminator switching event for activating a different illuminator source. In some such embodiments, the multi-sensor imaging apparatus 200 is preconfigured with the near-illuminator capture threshold (e.g., hard-coded with a value). In other embodiments, the multi-sensor imaging apparatus 200 determines the near-illuminator capture threshold, for example based on the defined pulse frequency and/or pulse phase associated with the near-field illuminator. In some such embodiments, the multi-sensor imaging apparatus 200 is configured to determine a number of captured images in the captured image set, and compare the determined number with the near-illuminator capture threshold to determine whether the number of captured images satisfies the threshold (e.g., by being equal to or exceeding the threshold, in at least some embodiments, or counting down from the threshold in other embodiments). Additionally or alternatively, in some embodiments, the multi-sensor imaging apparatus tracks the number of captured images as images are captured, such that the number of captured images may be compared with the near-illuminator capture threshold, for example after each successful image readout from a corresponding image sensor.

At optional operation 1106, the process 1100 includes determining an exposure time value for at least one image sensor is equal to a maximum exposure time, and/or determining a gain value for at least one image sensor is equal to a maximum gain value. In some embodiments, the exposure time value and/or the gain value for the corresponding image sensor being set to a maximum value indicates that the image sensor is being exposed to the greatest level of illumination without direct exposure during an illumination pulse. In this regard, in circumstances where one or more of such configuration values is at a maximum and a corresponding image property still does not satisfy an image property threshold, for example where a white level value does not satisfy a minimum white level threshold, switching to another illuminator source may be utilized to improve the image property for images captured by the image sensor. For example, in at least one example context, the white level value for far-field images may be increased (e.g., resulting in a higher brightness that may enable better detection and/or decoding of one or more visual indicia(s) within the captured image) by switching to activate the far-field illuminator source associated with the far-field image sensor when the far-field image sensor has been configured based on maximum configurations, such as a maximum gain value and/or maximum exposure time. It should be appreciated that the maximum value for one or more configurations may be hardware restricted, and/or may be a design-implemented restriction (e.g., where the maximum exposure time comprises 80% of the maximum exposure time possible via the image sensor as designed).

FIG. 12 illustrates additional operations for an example process for flicker reduction in a multi-imager environment, specifically for capturing images utilizing a far-field illumination, in accordance with at least one example embodiment of the present disclosure. In this regard, the example process 1200 may be performed by one or more specially configured apparatuses, such as the multi-sensor imaging apparatus 200. In this regard, in some such embodiments, the multi-sensor imaging apparatus 200 may be configured to perform one or more of the operations described herein utilizing one or more of the components therein, such as the processor 202, memory 204, and/or multi-sensor imaging engine 100. In some such embodiments, the multi-sensor imaging apparatus 200 is configured for performing one or more of the operations as depicted and described by executing computer program instructions stored therein, for example stored in the memory 204.

In some embodiments, the process 1200 is performed additional to, and/or in replacement of, one or more operations depicted and described with respect to another process herein. For example, as illustrated, in some embodiments the process 1200 begins after operation 1006 as depicted and described above with respect to FIG. 10. Additionally or alternatively, in at least some embodiments, at the conclusion of the process 1200 the flow terminates and/or returns to one or more operations depicted and described with respect to another process herein.

The process 1200 begins at operation 1202. At operation 1202, the process 1200 includes exposing the near-field image sensor during a first far-field illumination pulse. In some embodiments, the near-field image sensor is exposed at any time during the first far-field illumination pulse. For example, the exposure of the near-field image sensor may begin at some point in time before the first far-field illumination pulse, or in some embodiments after the first far-field illumination pulse has already begun. In at least one circumstance where the exposure time value for the near-field image sensor is shorter than the on-time for the first far-field illumination pulse, the exposure of the near-field image sensor may begin after the beginning of the first far-field illumination pulse. It should be appreciated that the illuminator source(s) and/or image sensor(s) may be controlled by one or more processors, such as the processor 202 and/or a processor internal to the multi-sensor imaging engine 100, as described herein.

In at least one example embodiment, the operation 1202 includes exposing the near-field image sensor beginning in near-alignment with a first far-field illumination pulse start time associated with a first far-field illumination pulse. In some embodiments, the processor 202 may determine the first far-field illumination pulse start time representing a timestamp at which the first far-field illumination pulse will begin, and delay until in near-alignment with the first far-field illumination pulse. In some embodiments, the exposure begins in alignment (e.g., at the same time) as the beginning of the first far-field illumination pulse, as represented by the first far-field illumination pulse start time. Additionally or alternatively, in at least some embodiments, the exposure begins within an acceptable range from the beginning of the first far-field illumination pulse. In at least one example embodiment, the exposure of the near-field image sensor begins in response to one or more signals transmitted to the near-field image sensor, for example activation signals transmitted from the processor 202 to the near-field image sensor.

At operation 1204, the process 1200 includes generating a second near-field image based on the exposure of the near-field image sensor. In this regard, the second near-field image may represent light captured by the near-field image sensor during exposure, for example which embodies a representation of a near field of view illuminated by the first far-field illumination pulse. In at least one context, the far-field illumination pulse illuminates only a portion of the near field of view, for example such that a center portion of the near field of view is illuminated during exposure of the near-field image sensor. In some embodiments, the second near-field image is output in any of a myriad of image formats, for example as a PNG, JPG, and/or the like.

At optional operation 1206, the process 1200 includes processing the second near-field image based on the image processing task. In some embodiments, for example, the processor 202 is configured to process the second near-field image for attempting to detect a visual indicia represented within the second near-field image, such as a 1D or 2D barcode. In one such example embodiment, the second near-field image is processed utilizing at least one visual indicia detection algorithm(s) and/or visual indicia decoding algorithm(s), as described herein. In this regard, the algorithm(s) may be executed for attempting to attempt and/or decode a visual indicia from the second near-field image.

At operation 1208, the process 1200 includes exposing a far-field image sensor during a second far-field illumination pulse. In this regard, after detecting the illuminator switch event, the multi-sensor imaging apparatus may initiate a mode that aligns both the near-field image sensor and far-field image sensor with the illumination pulses, since the far-field illumination does not overfill either of the captured field of views and thus does not negatively affect the capturing abilities of the image sensors via such overfilling. In this regard, the far-field illumination pulse may be specifically designed to illuminate the far field of view captured by the far-field image sensor. The exposure may be performed similarly to that for the near-field image sensor described above with respect to operation 1202. For example, in some embodiments, the far-field image sensor is exposed at any time during the second far-field illumination pulse. For example, the exposure of the far-field image sensor may begin at some point in time before the second far-field illumination pulse, or in some embodiments after the second far-field illumination pulse has already begun. In at least one circumstance where the exposure time value for the far-field image sensor is shorter than the on-time for the second far-field illumination pulse, the exposure of the far-field image sensor may begin after the beginning of the second far-field illumination pulse. It should be appreciated that the illuminator source(s) and/or image sensor(s) may be controlled by one or more processors, such as the processor 202 and/or a processor internal to the multi-sensor imaging engine 100, as described herein.

In at least one example embodiment, operation 1208 includes exposing the far-field image sensor beginning in near-alignment with a second far-field illumination pulse start time associated with a second far-field illumination pulse. In some embodiments, the multi-sensor imaging apparatus 200 may determine the second far-field illumination pulse start time representing a timestamp at which the second far-field illumination pulse will begin, and delay until in near-alignment with the second far-field illumination pulse. In some embodiments, the exposure begins in alignment with the beginning of the second far-field illumination pulse, as represented by the second far-field illumination pulse start time. Additionally or alternatively, in at least some embodiments, the exposure begins within an acceptable range from the beginning of the second far-field illumination pulse. In at least one example embodiment, the exposure of the far-field illumination pulse begins in response to one or more signals transmitted to the to the far-field image sensor, for example activation signal(s) transmitted from the processor to the far-field image sensor.

At operation 1210, the process 1200 includes generating a second far-field image based on the second exposure of the far-field image sensor. In this regard, the second far-field image may be read out from the far-field image sensor after the exposure time for the far-field image sensor elapses. The second far-field image may represent light captured by the far-field image sensor during the second exposure, for example which may embody a representation of the far field of view illuminated by the second far-field illumination pulse. As described, it should be appreciated that the second far-field image may be output in any of a myriad of formats, for example as a PNG, JPG, and/or the like.

At optional operation 1212, the process 1200 includes processing the second far-field image based on the image processing task. Similar to the processing described above, the multi-sensor imaging apparatus 200 is configured to process the second far-field image for attempting to detect a visual indicia within the far-field image, and/or decoding a detected visual indicia. As described, the second far-field image may be processed utilizing at least a visual indicia detection algorithm and/or visual indicia decoding algorithm to provide such functionality.

It should be appreciated that, in at least some embodiments, the capture cycle may continue for any number of captures. For example, in the context where captures alternate between the far-field image sensor and the near-field image sensor, flow may return to operation 1202. In other embodiments, the nearOfield image sensor and/or far-field image sensor may be utilized to capture any number of images before alternating to capture via the other image sensor. In at least one embodiment, the multi-sensor imaging apparatus is configured to cycle through image sensor(s) for capture using the same image capture cycle utilized during activation of the near-field illuminator source.

FIG. 13 illustrates additional operations for an example process for flicker reduction in a multi-imager environment, specifically for properly aligning exposure of the far-field image sensor during the far-field illumination, in accordance with at least one example embodiment of the present disclosure. In this regard, the example process 1300 may be performed by one or more specially configured apparatuses, such as the multi-sensor imaging apparatus 200. In this regard, in some such embodiments, the multi-sensor imaging apparatus 200 may be configured to perform one or more of the operations described herein utilizing one or more of the components therein, such as the processor 202, memory 204, and/or multi-sensor imaging engine 100. In some such embodiments, the multi-sensor imaging apparatus 200 is configured for performing one or more of the operations as depicted and described by executing computer program instructions stored therein, for example stored in the memory 204.

In some embodiments, the process 1300 is performed additional to, and/or in replacement of, one or more operations depicted and described with respect to another process herein. For example, as illustrated, in some embodiments the process 1300 begins after operation 1204 as depicted and described above with respect to FIG. 12. Additionally or alternatively, in at least some embodiments, at the conclusion of the process 1300, flow returns to operation 1206 as depicted and described with respect to FIG. 12 herein.

The process 1300 begins at operation 1302. At operation 1302, the process 1300 includes determining a timing offset until a next far-field pulse start time associated with a next far-field illumination pulse. In this regard, the timing offset may represent the length of time until a next far-field illumination pulse begins. In some embodiments, the next far-field pulse start time is determined based on the pulse frequency and/or pulse phase associated with the configured far-field illuminator source. It should be appreciated that, in at least some embodiments, the timing offset is determinable based on the pulse frequency, a previous far-field pulse start time and/or end time, a far-field sensor exposure time and/or readout time, and/or a combination thereof. In some embodiments, the multi-sensor imaging apparatus 200 is configured to track the time remaining until a next far-field illumination pulse after each far-field illumination pulse. Accordingly, the timing offset may be utilized to sufficiently delay so as to begin exposure of the far-field image sensor in near-alignment with a far-field illumination pulse, such that the captured data represents the illuminated far field of view.

At operation 1304, the process 1300 includes delaying for a length of time represented by the timing offset before exposing the far-field image sensor. In this regard, the exposure of the far-field image sensor may begin in near-alignment with the next far-field illumination pulse, for example at the same time as activation of the next far-field illumination pulse and/or within a predetermined offset from the activation of the next far-field illumination pulse. In some such embodiments, some or all of the exposure may occur during the next far-field illumination pulse such that the far-field image sensor captures a far-field of view illuminated by the far-field illumination pulse. It should be appreciated that, in some contexts where an image readout of the near-field image sensor is completed immediately before and/or within a predetermined offset from the next far-field illumination pulse start time for the next far-field illumination pulse, no delay may be necessary. As described, the multi-sensor imaging apparatus 200 may be configured to delay in any of a myriad of manners as described herein. Upon completion of the delay, the flow may continue to a subsequent operation for exposing the far-field image sensor, for example returning to operation 1206 as illustrated.

It should be appreciated that, in some contexts where the readout of the far-field image sensor is completed immediately before and/or within a predetermined offset from the next near-field pulse start time for the next near-field illumination pulse, no delay may be necessary. As described, the multi-sensor imaging apparatus 200 may be configured to delay in any of a myriad of manners, for example by executing other instructions and/or processes during that time, suspending execution of instructions, and/or otherwise scheduling a delayed execution after the length of time has elapsed. Upon completion of the delay, the flow may continue to a subsequent operation, for example returning to operation 714 as illustrated for exposing the near-field image sensor.

FIG. 14 illustrates additional operations for an example process for flicker reduction in a multi-imager environment, specifically for properly aligning exposure of the near-field image sensor during the far-field illumination, in accordance with at least one example embodiment of the present disclosure. In this regard, the example process 1400 may be performed by one or more specially configured apparatuses, such as the multi-sensor imaging apparatus 200. In this regard, in some such embodiments, the multi-sensor imaging apparatus 200 may be configured to perform one or more of the operations described herein utilizing one or more of the components therein, such as the processor 202, memory 204, and/or multi-sensor imaging engine 100. In some such embodiments, the multi-sensor imaging apparatus 200 is configured for performing one or more of the operations as depicted and described by executing computer program instructions stored therein, for example stored in the memory 204.

In some embodiments, the process 1400 is performed additional to, and/or in replacement of, one or more operations depicted and described with respect to another process herein. For example, as illustrated, in some embodiments the process 1400 begins after operation 1210 as depicted and described above with respect to FIG. 12. Additionally or alternatively, in at least some embodiments, at the conclusion of the process 1400, flow returns to operation 1212 as depicted and described with respect to FIG. 12 herein.

The process 1400 begins at operation 1402. At operation 1402, the process 1400 includes determining a timing offset until a next far-field pulse start time associated with a next far-field illumination pulse. In this regard, the timing offset may represent the length of time until a next far-field illumination pulse begins. In some embodiments, the next far-field pulse start time is determined based on the pulse frequency and/or pulse phase associated with the configured far-field illuminator source. It should be appreciated that, in at least some embodiments, the timing offset is determinable based on the pulse frequency, a previous far-field pulse start time and/or end time, a far-field sensor exposure time and/or readout time, and/or a combination thereof. In some embodiments, the multi-sensor imaging apparatus 200 is configured to track the time remaining until a next far-field illumination pulse after each far-field illumination pulse. Accordingly, the timing offset may be utilized to sufficiently delay activation of the near-field image sensor so as to begin exposure of the near-field image sensor in near-alignment with a far-field illumination pulse, such that the captured data represents the illuminated near field of view.

At operation 1404, the process 1400 includes delaying for a length of time represented by the timing offset before exposing the near-field image sensor. In this regard, the exposure of the near-field image sensor may begin in near-alignment with the next far-field illumination pulse, for example at the same time as activation of the next far-field illumination pulse and/or within a predetermined offset from the activation of the next far-field illumination pulse. In some such embodiments, some or all of the exposure may occur during the next far-field illumination pulse such that the near-field image sensor captures a near field of view illuminated by the far-field illumination pulse. It should be appreciated that, in some contexts where an image readout of the far-field image sensor is completed immediately before and/or within a predetermined offset from the next far-field illumination pulse start time for the next far-field illumination pulse, no delay may be necessary. As described, the multi-sensor imaging apparatus 200 may be configured to delay in any of a myriad of manners as described herein. Upon completion of the delay, the flow may continue to a subsequent operation for exposing the far-field image sensor, for example returning to operation 1212 as illustrated.

In this regard, the far-field image sensor and near-field image sensor may operate differently depending on whether the near-field illumination is active or whether the far-field illumination active. For example, when the near-field illumination is active, the near-field image sensor may be exposed in near-alignment with a near-field illumination pulse, such that the near-field illumination pulse illuminates the near-field of view during exposure for capturing the field of view. Additionally, when the near-field illumination is active, the far-field image sensor may be exposed between illumination pulses of the near-field illumination, such that only ambient lighting illuminates the near-field of view during such exposure. After the illumination switch event is detected and a far-field illumination is produced, each of the image sensors may be exposed during the illumination pulses without risk of negative effects on the operation of the image sensor. For example, the imaging apparatus may be triggered to enter a second mode in response to the illuminator switch event. Accordingly, during production of the far-field illumination, the near-field image sensor and far-field image sensor may each be exposed in near-alignment with at least one far-field illumination pulse of the far-field illumination. It should be appreciated that one or more timing offsets and/or corresponding delays may be utilized to properly align exposure times with a desired time frame (e.g., in near-alignment with the beginning of an illumination pulse, or between illumination pulses).

FIG. 15 illustrates additional operations for an example process for flicker reduction in a multi-imager environment, specifically for near-field illuminator reactivation, in accordance with at least one example embodiment of the present disclosure. In this regard, the example process 1500 may be performed by one or more specially configured apparatuses, such as the multi-sensor imaging apparatus 200. In this regard, in some such embodiments, the multi-sensor imaging apparatus 200 may be configured to perform one or more of the operations described herein utilizing one or more of the components therein, such as the processor 202, memory 204, and/or multi-sensor imaging engine 100. In some such embodiments, the multi-sensor imaging apparatus 200 is configured for performing one or more of the operations as depicted and described by executing computer program instructions stored therein, for example stored in the memory 204.

In some embodiments, the process 1500 is performed additional to, and/or in replacement of, one or more operations depicted and described with respect to another process herein. For example, as illustrated, in some embodiments the process 1500 begins after operation 1212 as depicted and described above with respect to FIG. 12. Additionally or alternatively, in at least some embodiments, at the conclusion of the process 1500, flow returns to operation 706 as depicted and described with respect to FIG. 7 herein.

The process 1500 begins at operation 1502. At operation 1502, the process 1500 includes detecting a near-field illuminator reactivation event. In this regard, the multi-sensor imaging apparatus 200 may detect one or more circumstances indicating the near-field illuminator source should be reactivated. It should be appreciated that the near-field illuminator reactivation event may be detected utilizing any of a myriad of determinations, processes, and/or the like. In some embodiments, a near-field illuminator reactivation event is detected in response to subsequent user engagement with one or more activation component(s) (e.g., a release and secondary trigger squeeze of an activation trigger). Alternatively or additionally, in at least some embodiments, the near-field illuminator reactivation event is detected based on at least an elapsed activation time for the far-field illuminator, for example such that the near-field illuminator source is reactivated after a far-field illuminator activation threshold elapses (e.g., the far-field illuminator source has been active for a threshold time period). Additionally or alternatively, in some embodiments, the near-field illuminator reactivation event is detected based on at least a number of captured images, and/or one or more image properties associated with the captured images and/or a subset thereof. For example, in some embodiments, the near-field illuminator reactivation event is detected in response to capturing a threshold number of images while the far-field illuminator source is active.

At operation 1504, the process 1500 includes deactivating the far-field illuminator source. In this regard, by deactivating the far-field illuminator source, the far-field illuminator source ceases producing far-field illumination pulses until reactivated (if reactivated). In some embodiments, one or more signals is/are transmitted to deactivate the far-field illuminator source. For example, in at least one example embodiment, the processor 202 is configured to transmit a deactivation signal to the far-field illuminator source to cause deactivation of the far-field illuminator source.

At operation 1506, the process 1500 includes producing a second near-field illumination using the near-field illuminator source. The second near-field illumination may similarly be associated with a second at least one near-field illumination pulse, each near-field illumination pulse associated with a near-field illumination pulse start time and/or end time. In some such embodiments, one or more activation signal(s) maybe transmitted to the near-field illuminator source to produce the far-field illumination. For example, in at least one example embodiment, the processor 202 may generate and/or transmit one or more activation signal(s) to the near-field illuminator source. It should be appreciated that the near-field illumination may include near-field illumination pulses based on a defined frequency and/or defined pulse phase, which may be the same as the first near-field illumination produced at an earlier operation.

Additionally or alternatively, in some embodiments, the multi-sensor imaging apparatus 200 may alter one or more configurations for the image sensors in response to detecting the near-field illuminator reactivation event. For example, in some embodiments, the exposure time value and/or gain value for the near-field image sensor and/or far-field image sensor may be set to default value(s). In this regard, the component(s) may be reset to again begin attempting to complete the image processing task utilizing the second near-field illumination.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code).

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for flicker reduction in a multi-imager environment, the method comprising:
   producing, using a first illuminator source of a plurality of illuminator sources, a first illumination, wherein the plurality of illuminator sources comprises more than two illuminator sources, and wherein the first illuminator source produces the broadest illumination among the plurality of illuminator sources;
   exposing a near-field image sensor during the first illumination;
   generating at least one near-field image based on the exposure of the near-field image sensor;
   exposing a far-field image sensor such that the exposure of the far-field image sensor is not during any pulse associated with the first illumination;
   generating a far-field image based on the exposure of the far-field image sensor; and
   detecting an illuminator switch event; and
   in response to the detection of the illuminator switch event:
      deactivating the first illuminator source; and
      producing, using a second illuminator source of the plurality of illuminator sources, a second illumination associated with at least one second illumination pulse, wherein a field of view illuminated by the second illuminator source is different than a field of view illuminated by the first illuminator source, and wherein the second illuminator source produces the narrowest illumination among the plurality of illuminator sources.

2. The method of claim 1, further comprising:
   exposing the near-field image sensor during the second illumination;
   generating a second near-field image based on the exposure of the near-field image sensor during the second illumination;
   exposing the far-field image sensor such that the exposure of the far-field image sensor is not during any pulse associated with the second illumination; and
   generating the second far-field image based on the exposure of the far-field image sensor during the second illumination.

3. The method of claim 1, further comprising:
   in response to generating the near-field image, determine a timing offset until a next near-field pulse start time associated with a next near-field illumination pulse of the at least one near-field illumination pulse,
   wherein the exposing the far-field image sensor occurs after delaying for a length of time represented by the timing offset combined with a difference between the next near-field pulse start time associated with the next near-field illumination pulse and a next near-field pulse end time associated with the next near-field illumination pulse.

4. The method of claim 1, wherein the field of view illuminated by the second illuminator source is narrower than the field of view illuminated by the first illuminator source.

5. The method of claim 1, the method further comprising, prior to exposing the near-field image sensor during the first illumination:
   determining that the near-field image sensor was last utilized for capturing an image that was successfully processed.

6. The method of claim 1, wherein a first pulse associated with the first illumination is produced at same rate and for a same length as a second pulse associated with the second illumination.

7. The method of claim 1, wherein each illuminator source of the plurality of illuminator sources is configured to produce illumination pulses based on a respective defined pulse frequency and a respective defined pulse phase.

8. The method of claim 1, wherein detecting the illuminator switch event comprises:
   determining each captured image of a captured image set is associated with an image property that does not satisfy an image property threshold, wherein the captured image set comprises at least the near-field image and the far-field image,
   wherein the captured image set comprises a number of captured images, wherein the number of captured images satisfies a near-illuminator capture threshold, and wherein the image property comprises an image white level value, and wherein the image property threshold comprises a minimum white level threshold.

9. The method of claim 1, wherein the near-field imaging sensor is utilized to capture a plurality of near-field images prior to exposing the far-field image sensor.

10. The method of claim 1, wherein the beginning of the exposure of the far-field image sensor is near-aligned with a first pulse end time of a first pulse associated with the near-field illumination.

11. The method of claim 1, the method further comprising:
processing the first far-field image to determine an image property associated with the far-field image does not satisfy an image property threshold associated with the image property; and
altering at least one of an exposure time value for the far-field image sensor or a gain value for the far-field image sensor.

12. An apparatus for flicker reduction in a multi-imager environment, the apparatus comprising:
a multi-sensor imaging engine comprising a plurality of illuminator sources, a near-field image sensor, and a far-field image sensor; and
a processor that configures the apparatus to:
produce, using a first illuminator source of the plurality of illuminator sources, a first illumination, wherein the plurality of illuminator sources comprises more than two illuminator sources, and wherein the first illuminator source produces the broadest illumination among the plurality of illuminator sources;
expose the near-field image sensor during the first illumination;
generate at least one near-field image based on the exposure of the near-field image sensor;
expose the far-field image sensor such that the exposure of the far-field image sensor is not during any pulse associated with the first illumination;
generate a first far-field image based on the exposure of the far-field image sensor;
detect an illuminator switch event; and
in response to the detection of the illuminator switch event:
deactivate the first illuminator source; and
produce, using a second illuminator source of the plurality of illuminator sources, a second illumination associated with at least one second illumination pulse, wherein a second field of view illuminated by the second illuminator source is different than a first field of view illuminated by the first illuminator source, and wherein the second illuminator source produces the narrowest illumination among the plurality of illuminator sources.

13. The apparatus of claim 12, wherein the apparatus is further configured to:
expose the near-field image sensor during the second illumination;
generate a second near-field image based on the exposure of the near-field image sensor during the second illumination;
expose the far-field image sensor such that the exposure of the far-field image sensor is not during any pulse associated with the second illumination; and
generate the far-field image based on the exposure of the far-field image sensor during the second illumination.

14. The apparatus of claim 12, wherein the apparatus is further configured to:
in response to generating the near-field image, determine a timing offset until a next near-field pulse start time associated with a next near-field illumination pulse of the at least one near-field illumination pulse,
wherein the exposing the far-field image sensor occurs after delaying for a length of time represented by the timing offset combined with a difference between the next near-field pulse start time associated with the next near-field illumination pulse and a next near-field pulse end time associated with the next near-field illumination pulse.

15. The apparatus of claim 12, wherein the field of view illuminated by the second illuminator source is narrower than the field of view illuminated by the first illuminator source.

16. The apparatus of claim 12, the apparatus further configured to, prior to exposing the near-field image sensor during the first illumination:
determine that the near-field image sensor was last utilized for capturing an image that was successfully processed.

17. The apparatus of claim 12, wherein a first pulse associated with the first illumination is produced at a same rate and for a same length as a second pulse associated with the second illumination.

18. The apparatus of claim 12, wherein each illuminator source of the plurality of illuminator sources is configured to produce illumination pulses based on a respective defined pulse frequency and a respective defined pulse phase.

19. A computer program product for flicker reduction in a multi-imager environment, the computer program product comprising at least one non-transitory computer-readable storage medium having computer program code stored thereon, the computer program code, in execution with at least one processor, configured for:
producing, using a first illuminator source of a plurality of illuminator sources, a first illumination, wherein the plurality of illuminator sources comprises more than two illuminator sources, and wherein the first illuminator source produces the broadest illumination among the plurality of illuminator sources;
exposing a near-field image sensor during the first illumination;
generating at least one near-field image based on the exposure of the near-field image sensor;
exposing a far-field image sensor such that the exposure of the far-field image sensor is not during any pulse associated with the first illumination;
generating a first far-field image based on the exposure of the far-field image sensor;
detecting an illuminator switch event; and
in response to the detection of the illuminator switch event:
deactivating the first illuminator source; and
producing, using a second illuminator source of the plurality of illuminator sources, a second illumination associated with at least one second illumination pulse, wherein a second field of view illuminated by the second illuminator source is different than a first field of view illuminated by the first illuminator source, and wherein the second illuminator source produces the narrowest illumination among the plurality of illuminator sources.

20. The computer program product of claim 19, wherein the computer program code, in execution with the at least one processor, is further configured for:
exposing the near-field image sensor during the second illumination;
generating a second near-field image based on the exposure of the near-field image sensor during the second illumination;

exposing the far-field image sensor such that the exposure of the far-field image sensor is not during any pulse associated with the second illumination; and
generating the far-field image based on the exposure of the far-field image sensor during the second illumination.

* * * * *